(12) United States Patent
Johns et al.

(10) Patent No.: US 7,878,225 B2
(45) Date of Patent: Feb. 1, 2011

(54) VACUUM ATTACHMENT AND METHOD

(75) Inventors: Clifford L. Johns, Louisville, KY (US);
Daniel D. Sympson, Louisville, KY (US); August M. Dattilo, III, Louisville, KY (US); Munaf Najmuddin Chasmawala, Louisville, KY (US); Manfred Schmidt, Louisville, KY (US)

(73) Assignee: Tubemaster, Inc., Louisville, KY (US)

( * ) Notice: Subject to any disclaimer, the term of this patent is extended or adjusted under 35 U.S.C. 154(b) by 365 days.

(21) Appl. No.: 11/954,495

(22) Filed: Dec. 12, 2007

(65) Prior Publication Data

US 2008/0142045 A1    Jun. 19, 2008

Related U.S. Application Data

(60) Provisional application No. 60/870,488, filed on Dec. 18, 2006, provisional application No. 60/914,551, filed on Apr. 27, 2007, provisional application No. 60/978,940, filed on Oct. 10, 2007.

(51) Int. Cl.
*B01J 8/00* (2006.01)

(52) U.S. Cl. .............................. 141/65; 141/8; 141/11; 134/21; 134/166 C; 15/319; 15/345

(58) Field of Classification Search ............ 141/8, 141/11, 44–45, 47, 50, 65, 67; 134/21, 166 C, 134/169 C; 15/319, 345
See application file for complete search history.

(56) References Cited

U.S. PATENT DOCUMENTS

| | | | |
|---|---|---|---|
| 3,164,272 A * | 1/1965 | Oliver | 422/197 |
| 3,916,960 A | 11/1975 | Thompson | |
| 4,280,983 A * | 7/1981 | Irwin | 422/219 |
| 4,820,496 A * | 4/1989 | Sapoff | 134/166 C |
| 4,994,241 A * | 2/1991 | Sapoff | 134/166 C |
| 5,114,685 A * | 5/1992 | Sapoff | 134/166 C |
| 5,127,960 A * | 7/1992 | Dittrich et al. | 134/21 |
| 5,222,533 A | 6/1993 | Porter, Jr. | |
| 5,228,484 A | 7/1993 | Johnson | |
| 5,307,866 A * | 5/1994 | Weigel | 134/167 C |
| 6,182,716 B1 * | 2/2001 | Fry | 141/67 |
| 6,360,786 B1 * | 3/2002 | Fry | 141/67 |
| 6,431,224 B1 * | 8/2002 | Fry | 141/8 |
| 6,619,571 B1 | 9/2003 | Hourticolon et al. | |
| 6,723,171 B2 * | 4/2004 | Yunoki | 134/8 |
| 6,725,706 B2 | 4/2004 | Johns et al. | |
| 6,981,404 B2 | 1/2006 | Johns et al. | |
| 7,285,251 B2 | 10/2007 | Johns et al. | |

FOREIGN PATENT DOCUMENTS

| | | | |
|---|---|---|---|
| DE | 888385 | * | 8/1953 |
| EP | 1226865 | | 7/2002 |
| FR | 2579573 | | 10/1986 |
| GB | 2173122 | | 10/1986 |
| WO | WO 94/20396 | * | 9/1994 |
| WO | WO 98/02239 | * | 1/1998 |

* cited by examiner

*Primary Examiner*—Timothy L Maust
*Assistant Examiner*—Nicolas A Arnett
(74) *Attorney, Agent, or Firm*—Theresa Fritz Camoriano; Guillermo Camoriano; Camoriona and Associates

(57) ABSTRACT

A device and method for vacuuming solid particles out of a chemical reactor tube. One embodiment comprises the step of substantially reducing the vacuum level applied to the vacuum conduit when the conduit reaches a desired depth within the reactor tube by using means responsive to the depth to which the vacuum conduit is inserted into the reactor tube.

12 Claims, 27 Drawing Sheets

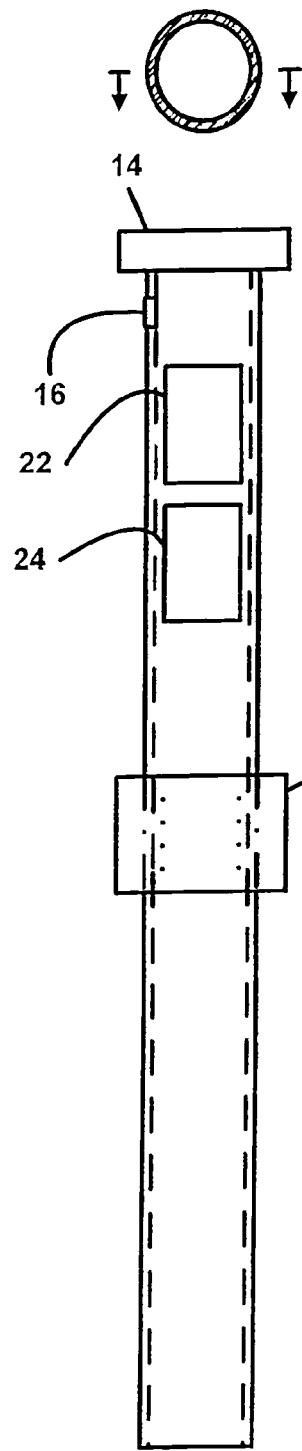
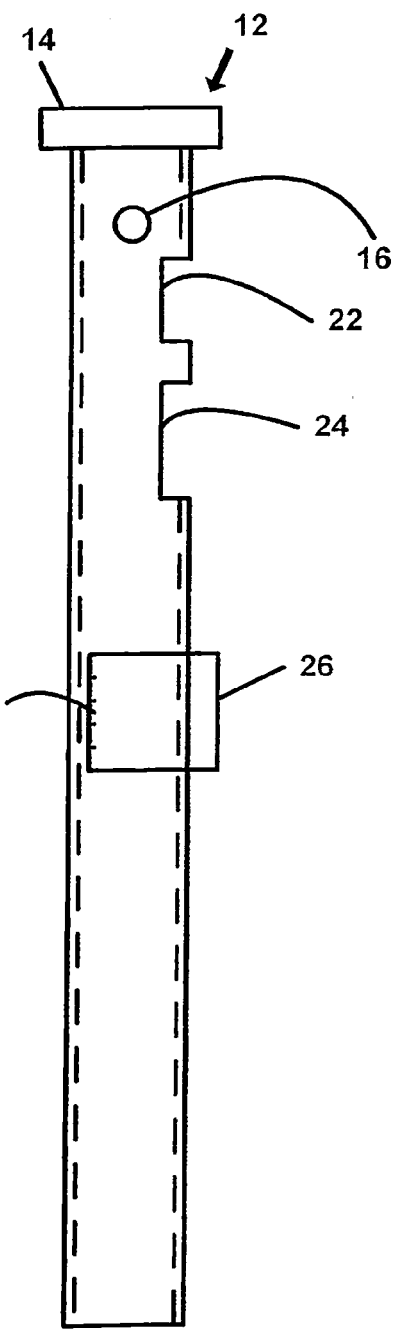
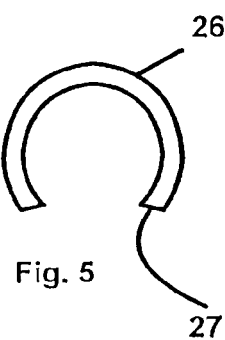
Fig. 2
Fig. 3
Fig. 4
Fig. 5
Fig. 6

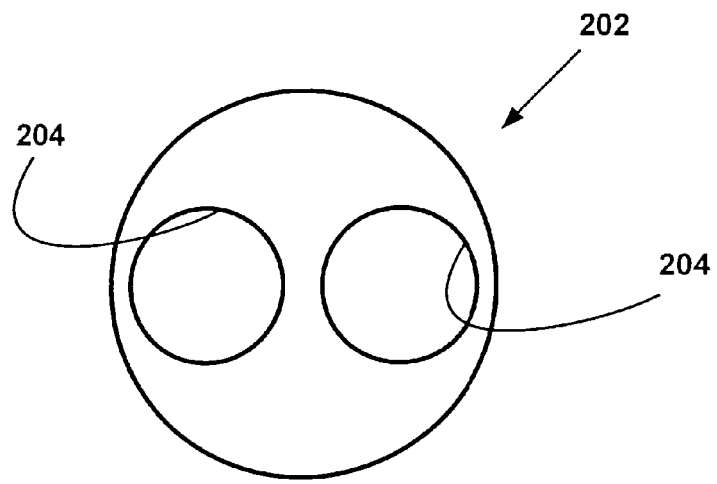
Fig. 35
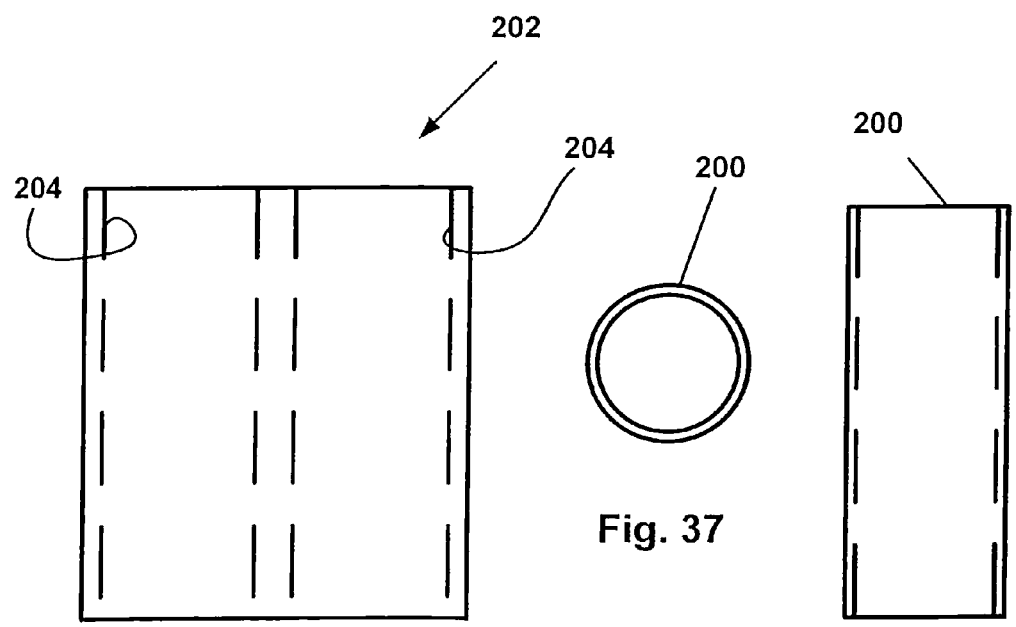
Fig. 36
Fig. 37
Fig. 38

VACUUM ATTACHMENT AND METHOD

This application claims priority from U.S. Provisional Application Ser. No. 60/870,488, filed Dec. 18, 2006, from U.S. Provisional Application Ser. No. 60/914,551, filed Apr. 27, 2007, and from U.S. Provisional Application Ser. No. 60/978,940, filed Oct. 10, 2007, all of which are hereby incorporated herein by reference. The present device and method are intended to be used primarily to vacuum catalyst out of chemical reactor tubes.

BACKGROUND

Many chemical reactors use vertical tubes which are filled to a desired elevation with catalyst. There typically is an empty space between the top of the catalyst and the top of the reactor tube, which is known as the outage. The elevation of the top of the catalyst is often referred to as the outage level. In order to ensure that the level of catalyst is uniform throughout the tubes, it is common to vacuum catalyst out of those tubes in which the outage level is too high. However, this vacuuming often jostles, breaks, and otherwise damages or diminishes the catalyst. It also has been difficult and time consuming to ensure that the catalyst is vacuumed to the correct outage level in every reactor tube. Vacuuming also may be used to clean out the chemical reactor tubes before loading them with new catalyst.

BRIEF DESCRIPTION OF THE DRAWINGS

FIG. 2 is a view taken along the line 2-2 of FIG. 1;

FIG. 3 is a front schematic view of the vacuum attachment of FIG. 1 with the shuttle, slide and spring removed;

FIG. 4 is a front view of the stop of FIG. 1;

FIG. 5 is a top view of the stop of FIG. 4;

FIG. 6 is a left side view of the vacuum attachment of FIG. 3;

FIG. 35 is a top view of a fixture used with the device of FIG. 28;

FIG. 36 is a front view of the fixture of FIG. 35;

FIG. 37 is a top view of a tube used with the fixture of FIG. 35;

FIG. 38 is a side view of the tube of FIG. 37;

DESCRIPTION

Figure 1:
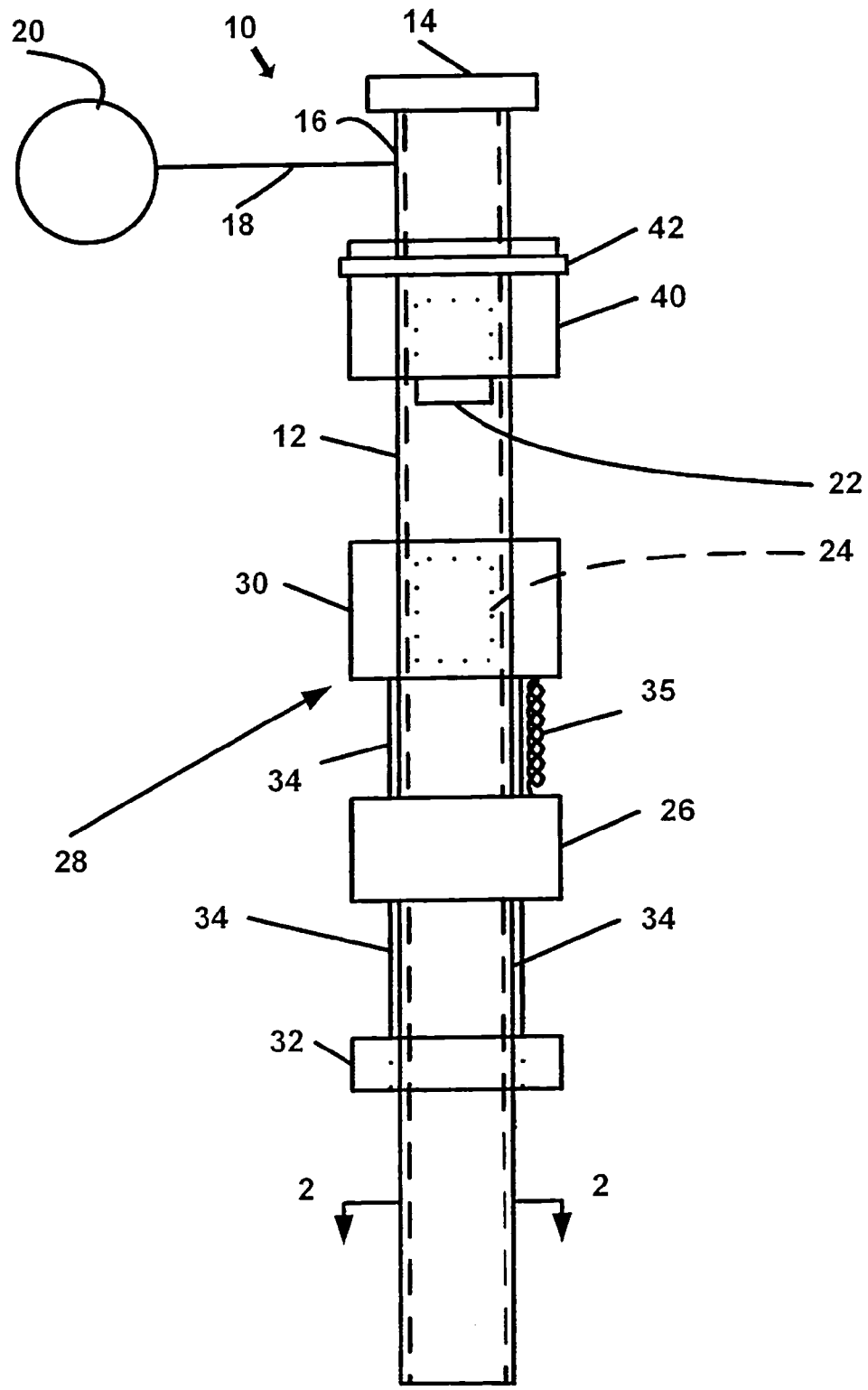
FIG. 1 is a schematic front view of a vacuum attachment.

FIGS. 1-13 show a first embodiment of a vacuum attachment 10. The vacuum attachment 10 includes a pipe 12, shown best in FIGS. 3 and 6, which is adapted to be connected to a vacuum hose 11 at its top end 14. The vacuum hose 11 (shown in FIG. 1A) may clamp over the top end 14, or it may be connected to the top end of the pipe 12 in some other known manner, such as by being inserted into the top end 14 with a snug fit or being connected by a threaded connector or by using tape or by other known connecting means. The hose 11 preferably is flexible (while the pipe 12 is more rigid), and it may be from a shop vacuum or some other vacuum source 3. The pipe 12 and hose 11 together serve as a conduit or enclosed passageway to carry particles out of the reactor tube to a remote location.

The pipe 12 has a side wall with a circular cross-section. The side wall defines a small opening 16 near its top end 14, which receives an extension tube 18 that connects to a pressure gauge 20, as shown in FIG. 1. The pressure gauge 20 alternatively may be fixed directly to the pipe 12 without using the extension tube 18. The side wall of the pipe 12 also defines an upper window opening 22 and a lower window opening 24. A partial cylindrical stop 26 is fixed to the pipe 12 below the lower window opening 24. In this case, the stop 26 is adhered to the pipe 12 by means of an adhesive.

The stop 26 is made from a larger diameter pipe, which has an inside diameter that matches the outside diameter of the pipe 12 and which has had a vertical strip cut away to form a C-shaped cross-section, as shown in FIGS. 5 and 6. The stop 26 may be fixed to the pipe 12 by any known method, such as by welding, gluing, or by use of a setscrew.

A shuttle 28, shown in FIGS. 7-10, is mounted over the pipe 12, as shown in FIG. 1. The shuttle 28 is made from the same larger diameter cylindrical pipe as the stop 26, and that larger diameter pipe has been partially cut away between its cylindrical upper portion 30 and its cylindrical lower portion 32 to provide a central portion 34 having an arcuate cross-section, which spans slightly less than the angular portion that was cut away to form the stop 26, so the central portion 34 of the shuttle 28 fits within the opening 27 defined by the partial cylindrical stop 26, allowing the central portion 34 of the shuttle 28 to slide up and down relative to the pipe 12 without interfering with the stop 26. The stop 26 guides the shuttle 28 as it slides up and down relative to the pipe, preventing the shuttle 28 from rotating relative to the pipe 12.

As shown in FIG. 1, the stop 26 is located between the upper and lower full cylindrical ends 30, 32 of the shuttle 28 (also referred to as collars 30, 32), so it limits the travel of the shuttle 28 up and down relative to the pipe 12. A spring 35 is connected between the upper end 30 of the shuttle 28 and the stop 26, biasing the shuttle 28 downwardly so that, when the shuttle 28 is in its "at rest" or lowermost position, as shown in FIG. 1, the cylindrical upper end 30 of the shuttle 28 has compressed the spring 35 against the top of the stop 26 and has closed off the lower window 24. At the upper limit of travel of the shuttle 28, the lower cylindrical end 32 of the shuttle 28 contacts the bottom of the stop 26. While the window openings 22, 24 are depicted as rectangular, they can have any desired shape, including square, circular, trapezoidal, and/or triangular. The window openings 22, 24 need not be identical to each other and may have any shape or combination of shapes to provide the desired flow rate as described in more detail below.

Also shown in FIG. 1 is a vacuum regulator 40, which is made from the same larger diameter pipe as the stop 26, with a thin vertical strip cut out of it, and which is clamped in the desired position on the pipe 12 by means of a clamp 42, leaving the desired amount of the upper window 22 exposed in order to regulate the amount of vacuum that is applied by the vacuum attachment 10. The amount of vacuum can be determined by looking at the pressure gauge 20, and the vacuum regulator 40 may be adjusted up and down to adjust the amount of the window opening 22 that is exposed in order to provide the desired amount of vacuum inside the pipe 12. If the entire upper window 22 is covered by the vacuum regulator 40, then the entire vacuum level provided by the vacuum hose 11 will be applied at the inlet end of the pipe 12. As more of the upper window 22 is exposed, allowing air to be pulled into the window, the vacuum level that is applied at the inlet end of the pipe 12 is reduced. While seals are not shown here, it is possible to provide seals between the vacuum regulator 40 and the pipe 12 and between the upper portion 30 of the shuttle 28 and the pipe 12, if desired, to prevent undesired leakage of air. Of course, the vacuum level at the vacuum source 3 or at other points along the path may be adjusted in order to adjust the vacuum level at the inlet end of the vacuum attachment 12 instead of, or in addition to, the vacuum level adjustment possible with the vacuum regulator 40. An example of this is depicted in FIG. 1A, wherein an adjustable vent opening 8 may be used to adjust the vacuum level, as described in more detail below.

Note that, in the context of this specification, increasing the vacuum level means reducing the pressure, so the device vacuums more, while decreasing the vacuum level means increasing the pressure, so the device vacuums less.

Figure 1A:
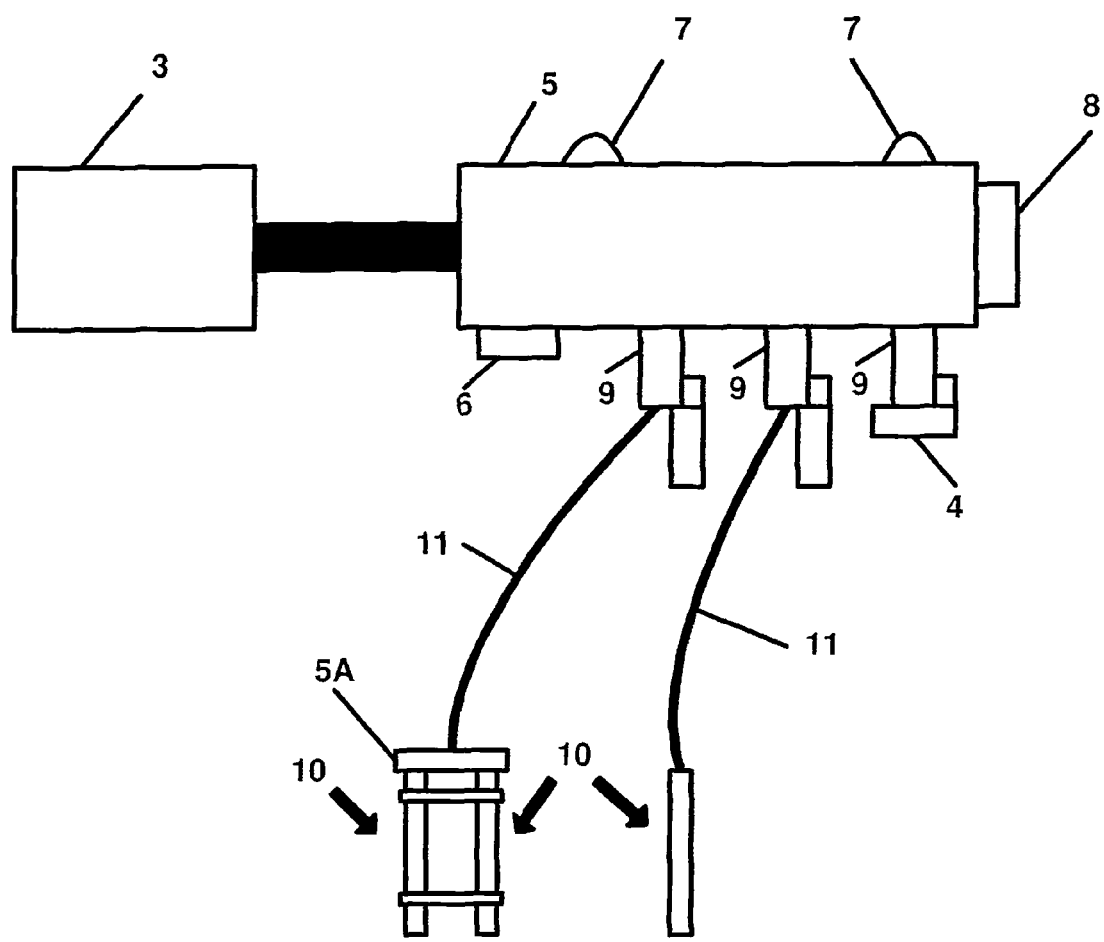
FIG. 1A is a schematic view of three of the vacuum attachments of FIG. 1 being connected to a vacuum source through a manifold.
Figure 21:
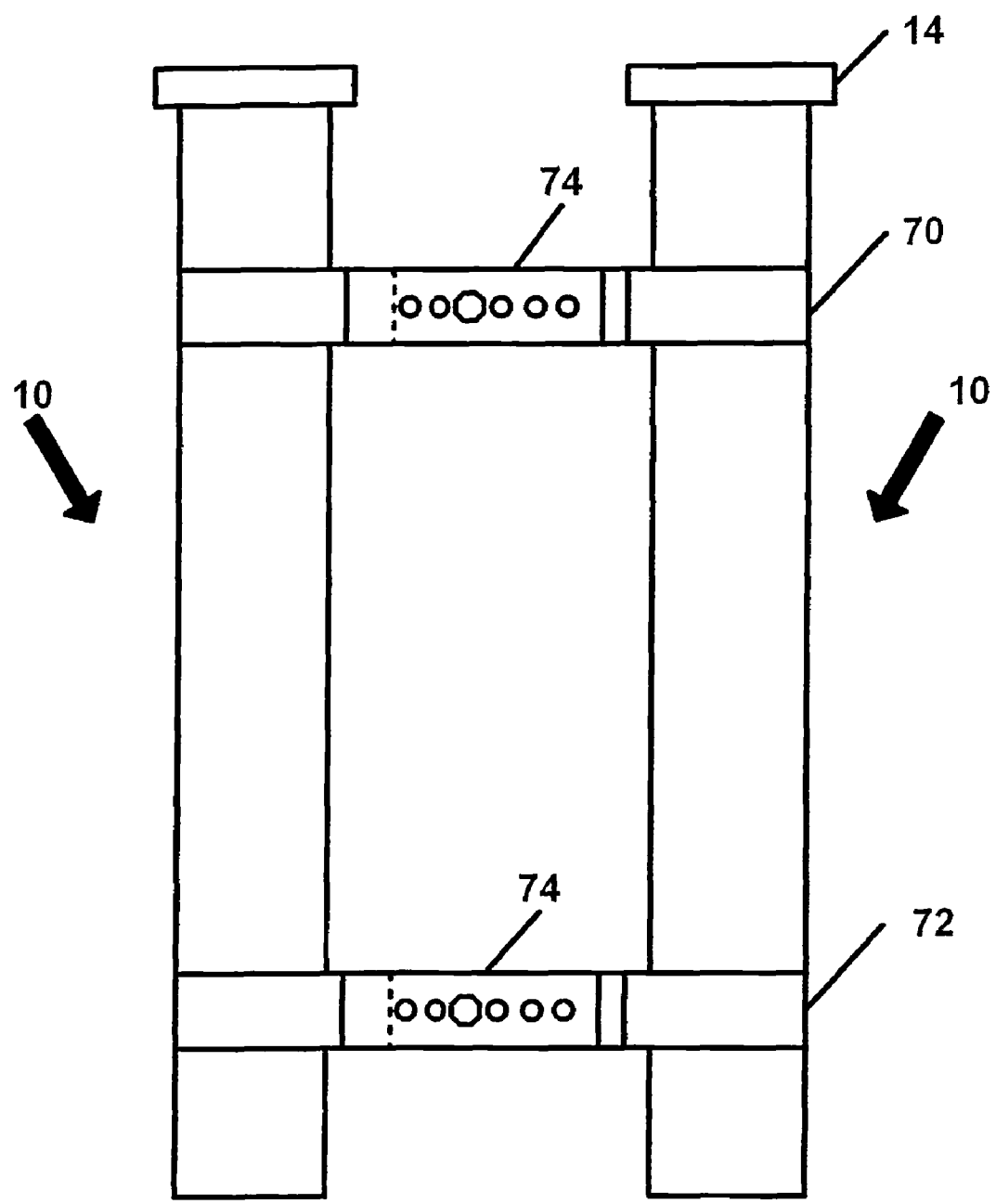
FIG. 21 schematically shows two of the vacuum attachments of FIG. 1 rigidly connected together.

FIG. 1A shows one arrangement in which the vacuum attachment 10 may be connected to a vacuum source 3 through a manifold 5, which, in this case, is suspended above the tube sheet of a vertical tube chemical reactor by means of bails 7. The manifold 5 has a plurality of ports 9, to which hoses 11 are connected. One of the ports 9 is closed off by a cap 4, which is hinged to its respective port 9. There is a pressure gauge 6 on the manifold 5, and there is an adjustable vent opening 8, which can be adjusted to control the vacuum level at the manifold 5. One hose 11 from the manifold 5 is connected to a single vacuum attachment 10, and another hose 11 from the manifold 5 is connected to a second manifold 5A, which, in turn, is connected to two vacuum attachments 10 that are rigidly fixed together, as shown in FIG. 21 and as will be explained later.

A first conduit is defined from the free end (the inlet end) of the vacuum attachment 10, through its outlet, which is connected to its respective vacuum hose 11, through that hose 11 and through the manifold 5 to the outlet of the vacuum source 3.

Figures 11, 12, 13:
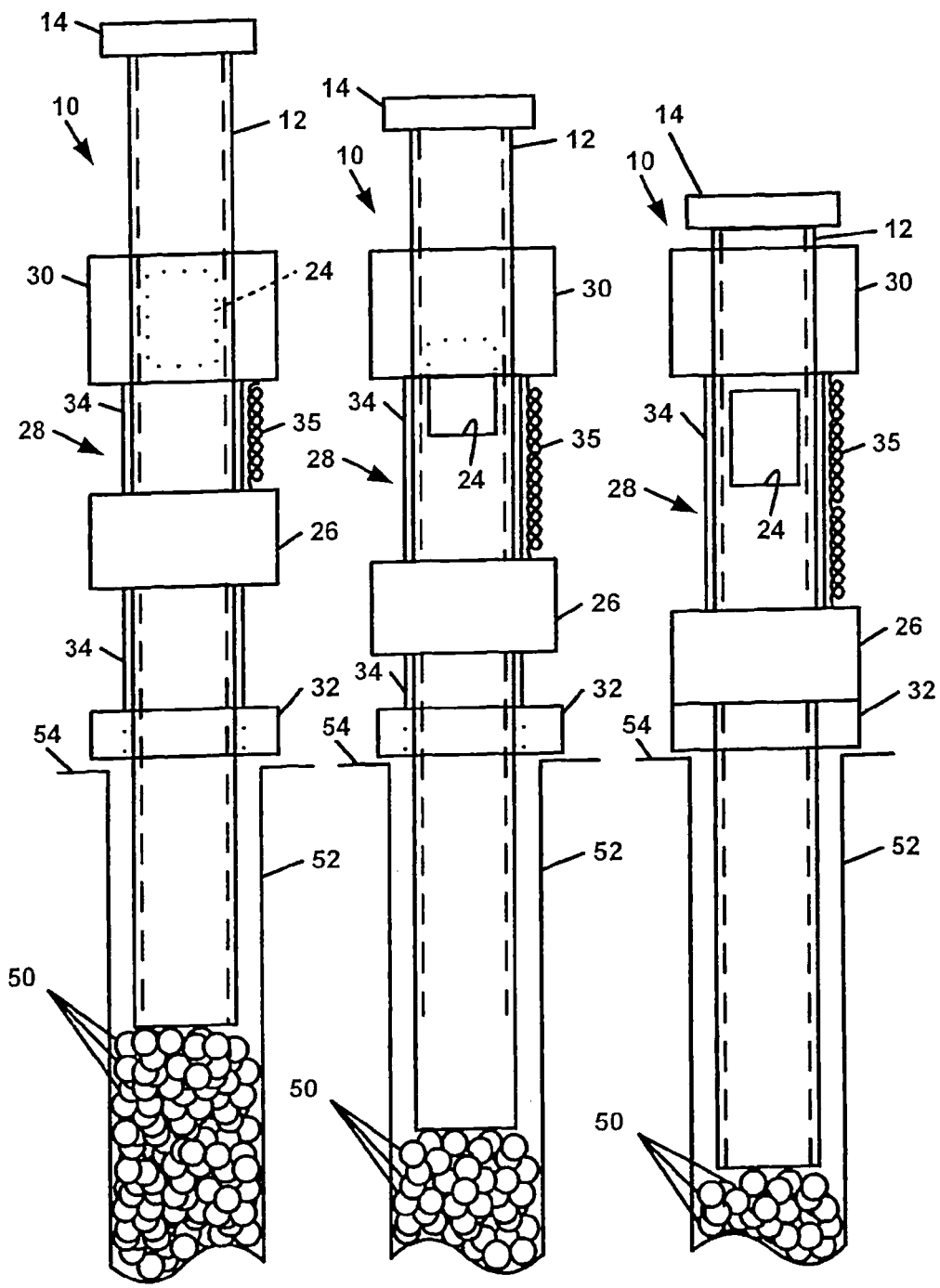
FIG. 11 is a schematic view of the vacuum attachment of FIG. 1 as it begins vacuuming particles out of a chemical reactor tube.
FIG. 12 is the same view as FIG. 11 but with the attachment projecting farther into the reactor tube as more particles are vacuumed out.
FIG. 13 is the same view as FIG. 12 but with the attachment projecting farther into the reactor tube as the particles have been vacuumed out to the desired outage level.

FIGS. 11-13 are schematic views showing the single vacuum attachment 10 being used to vacuum solid catalyst particles 50 from a chemical reactor tube 52. In these views, the upper window 22, vacuum regulator 40, and clamp 42 have been omitted for clarity. Also, the hose 11 has been omitted for clarity.

In FIG. 11, the shuttle 28 is in its "at rest" or lowermost position relative to the tube 12, with the spring 35 compressed and the upper portion 30 of the shuttle 28 covering the window 24. The lower portion 32 of the shuttle 28 is resting on the top of the tube sheet 54 of the chemical reactor, and the inlet end of the vacuum attachment 10 has been inserted into the reactor tube 52. The vacuum source 3 has been activated, so it is pulling a vacuum through the manifold 5, through the hose 11, and through the pipe 12. The pressure at the free end (the inlet end) of the pipe 12 is low enough that it vacuums out the catalyst particles 50 as it enters into the reactor tube 52, vacuuming out the particles 50 to a first level, which is slightly below the bottom (inlet) end of the pipe 12. Of course, the particles 50 and gases flow through the pipe 12, through the hose 11, through the manifold 5, and to a collection hopper associated with the vacuum source 3.

As the operator pushes the attachment 10 farther into the reactor tube 52, he vacuums out more of the catalyst particles 50. As the attachment 10 is pushed into the reactor tube 52, the lower portion 32 of the shuttle 28 remains in the same position, resting on the top of the tube sheet 54, so the pipe 12 moves downwardly relative to the shuttle 28, stretching the spring 35. As the pipe 12 moves downwardly relative to the shuttle 28, the portion of the pipe 12 that defines the window opening 24 eventually moves down below the upper collar 30 of the shuttle 28, exposing the window 24, which allows air to enter through the window opening 24, thereby reducing the vacuum level that is being applied at the inlet of the pipe 12.

FIG. 13 shows the window 24 fully exposed and the lower portion of the shuttle 28 contacting the bottom of the stop 26. In practice, depending upon the vacuum level and the size of the window 24, the device 10 may stop vacuuming catalyst 50 before the window 24 is fully open.

Figure 7:
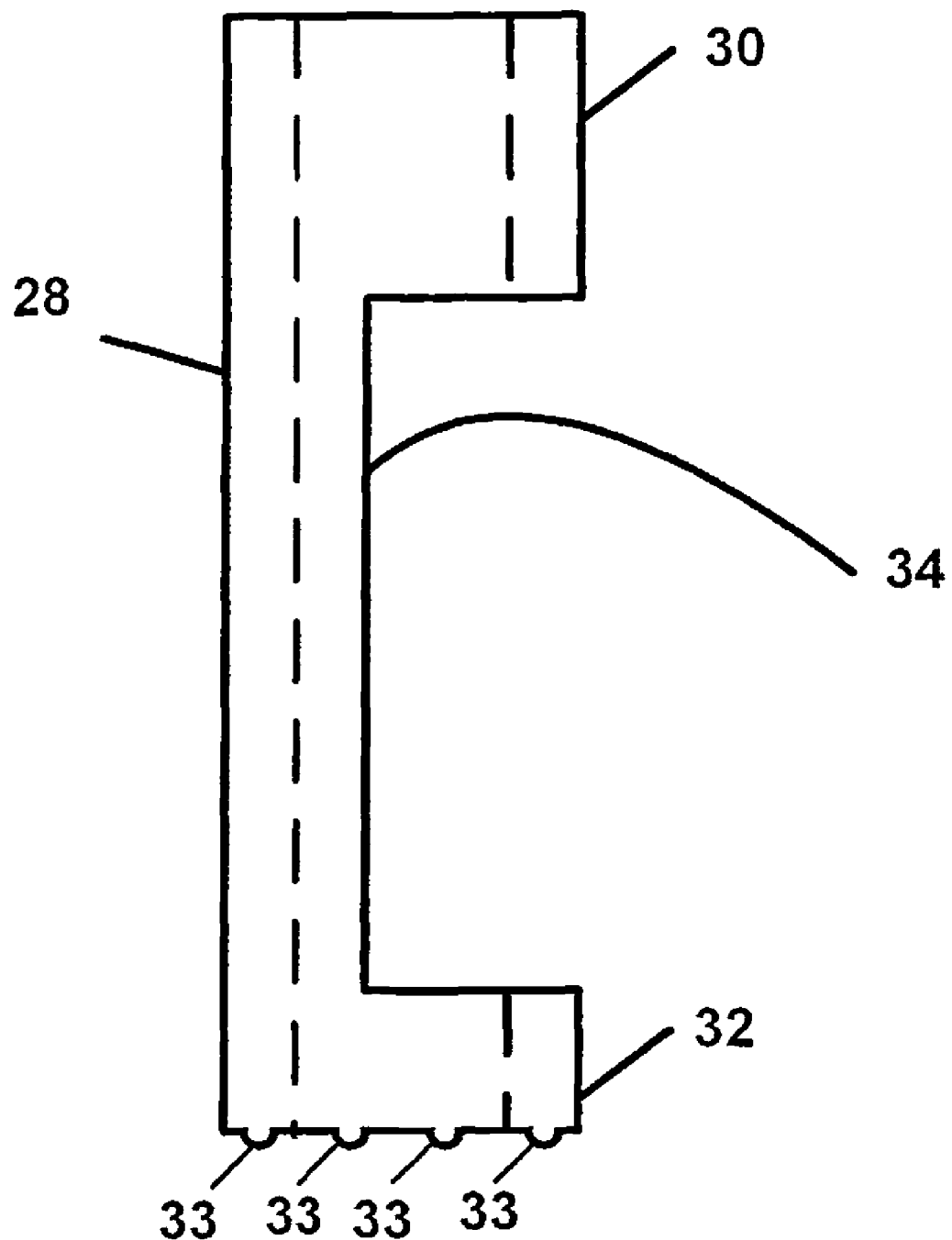
FIG. 7 is a left side view of the shuttle of FIG. 1.
Figure 8:
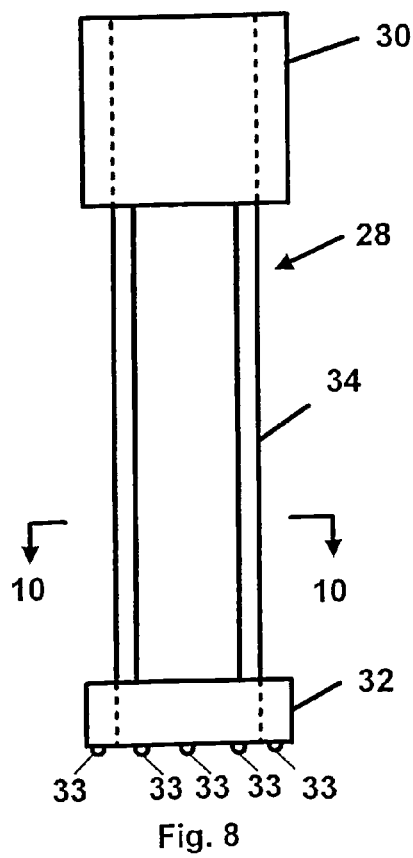
FIG. 8 is a front view of the shuttle of FIG. 1.
Figure 9:
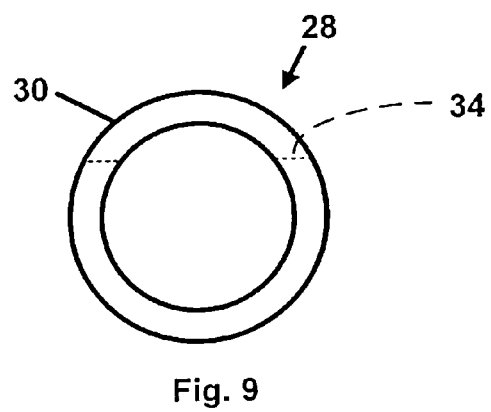
FIG. 9 is a top view of the shuttle of FIG. 8.
Figure 10:
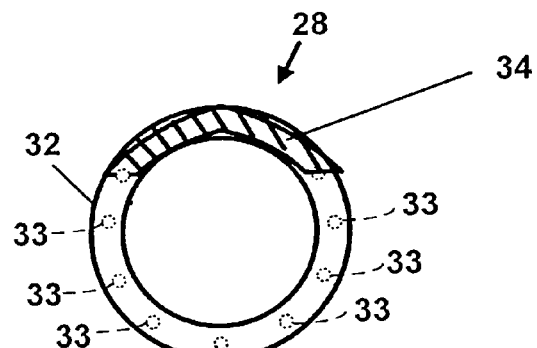
FIG. 10 is a view taken along the line 10-10 of FIG. 8.

The vacuum level, the size of the window 24, the distance between the upper and lower collars 30, 32 of the shuttle 28, and the relative positions of the shuttle 28 and stop 26 may be designed as desired so the vacuum is substantially reduced at the inlet of the pipe 12 and the device stops vacuuming catalyst when the inlet reaches the desired outage or level. It should be noted that the bottom of the lower collar 32 of the shuttle 28 has a plurality of projections 33, as shown in FIGS. 7, 8 and 10, to keep the lower collar 32 from completely sealing against the tubesheet 54. The space between the lower collar 32 and the tubesheet, and the space between the outside of the pipe 12 and the reactor tube forms a pathway that allows air to pass from outside the reactor, between the lower collar 32 and the tubesheet 54 and into the top of the chemical reactor tube 52 when the lower collar 32 contacts the tube sheet 54 and the pipe 12 is inside the reactor tube. This air pathway allows for outside air to enter through the top of the reactor tube 52 to help fluidize the particles near the top of the reactor tube in order to help vacuum them out the top without displacing the particles farther down in the reactor tube and without having to draw air all the way from the bottom of the reactor tube 52 and through the entire column of particles 50.

Alternatively, the lower collar 32 may be only a partial cylinder, leaving a gap for air to pass through into the space between the pipe 12 and the reactor tube 52. In that case, external air again flows through the gap, through the space between the pipe 12 and the reactor tube 52, and into the inlet at the bottom of the pipe 12, again defining a second pathway for external air to enter through the top of the reactor tube 52 to be used for the vacuuming process.

This provides a superior result to using air pulled up from the open bottom of the reactor tube 52 for several reasons. First, there is less of a pressure drop for air to flow through the secondary pathway than for it to flow from the bottom of the reactor tube, through the long column of catalyst to the inlet of the pipe 12, which means that the vacuum source does not have to overcome as much of a pressure drop in order to create sufficient air flow to vacuum up the particles. Also, the air that flows through the second pathway helps fluidize the upper portion of the catalyst without disturbing the catalyst particles further down in the reactor tube. This facilitates the vacuuming of the particles that need to be vacuumed out while causing the minimum amount of damage both to the vacuumed particles and to the particles that remain in the reactor tube.

It is preferred that the gas flowing through this secondary pathway (entering through the top of the reactor tube 52) make up at least one-third of the gas that is drawn out of the reactor tube 52 and into the vacuum pipe 12. It is more preferred that the gas flowing through this secondary pathway make up a majority of the gas that is drawn out of the reactor tube 52 and into the vacuum pipe 12.

When the vacuum attachment 10 is lifted upwardly out of the chemical reactor tube 52, the spring 35 again contracts, pulling the upper collar 30 down to close off the window opening 24. This action also resets the entire shuttle 28 to prepare the vacuum attachment 10 for vacuuming out the next chemical reactor tube 52 and reestablishes the full vacuum level at the inlet of the pipe 12.

While this vacuum attachment 10 has a shuttle 28, which automatically moves up to open the window 24 and stop the vacuuming, it should be noted that the attachment 10 could be even simpler, not having an automatic shuttle, but instead relying on the operator to open and close the window 24 by placing his hand or thumb over the window or by manually sliding a cover over the window 24 to close the window 24 and then sliding the cover away to open the window 24. The cover could be shaped like the stop 26 and would be manually slid vertically or rotated about the axis of the pipe 12 to open and close the window 24. If the operator starts and stops the vacuuming manually, then there probably will be a marking on the outside of the pipe 12 to indicate the level to which the vacuum attachment 10 should be extended down into the reactor tube 52, and the operator will open the window 24 when the attachment 10 has reached that level. (See U.S. Pat. No. 7,285,251 issued Oct. 23, 2007 which is hereby incorporated herein by reference, to show examples of some of the types of markings that may be used.)

The embodiment described above utilizes a mechanical interlock to automatically open the window opening 24 when the bottom end (also referred to as the inlet end) of the vacuum pipe 12 has reached the desired depth, so as to decrease the vacuum level at the inlet end of the vacuum pipe 12 to stop the further vacuuming of catalyst particles 50 from the tube 52.

It should also be noted that this same function (the automatic reduction of the vacuum being applied at the inlet end of the pipe 12) can be accomplished by a number of other means, some of which are described in more detail below. For instance, a proximity sensor or an electrical switch could be mounted on the pipe 12 such that, when the proximity sensor or switch approaches or reaches the tube sheet 54, a signal is sent to a valve, such as a solenoid valve located somewhere between the inlet end of the pipe 12 and the vacuum source 3, to open up to allow air to enter. Alternatively, the automatic valve could be used to shut off fluid communication between the inlet end of the pipe 12 and the vacuum source 3 in order to decrease the vacuum level being applied at the inlet end of the vacuum pipe 12. In another alternative, the proximity sensor or electrical switch could simply turn off the vacuum source.

It may be noted that, in FIGS. 11-13, the pipe 12 of the vacuum attachment 10 has a smaller diameter than the inside diameter of the chemical reactor tube 52 into which it is inserted, in order to leave space around the outside of the pipe 12 for air to go down into the reactor tube around the outside of the pipe 12.

The alternative embodiments shown in FIGS. 14-17 provide a second conduit for air to flow downwardly within the pipe itself, so the outside diameter pipe size can be very close to the inside diameter size of the chemical reactor tube 52 into which it is inserted.

Figure 14:
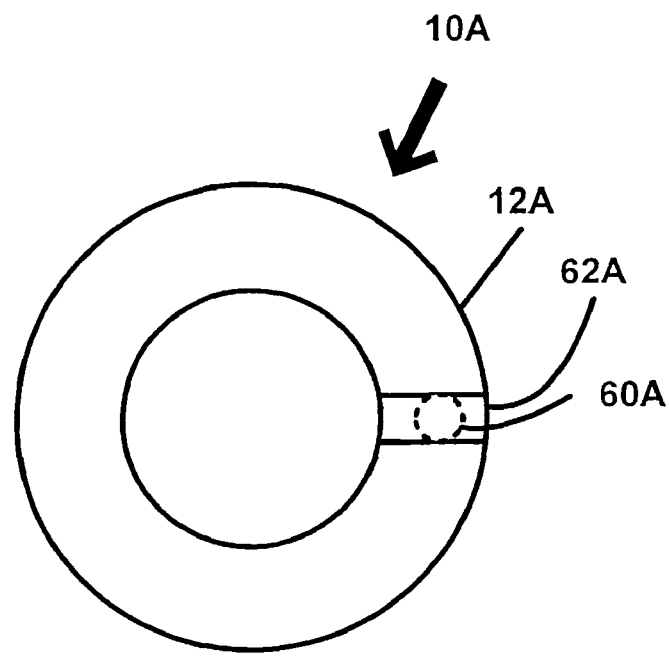
FIG. 14 is a schematic top view of an alternative vacuum attachment, with the shuttle, slide and spring removed for clarity.
Figure 15:
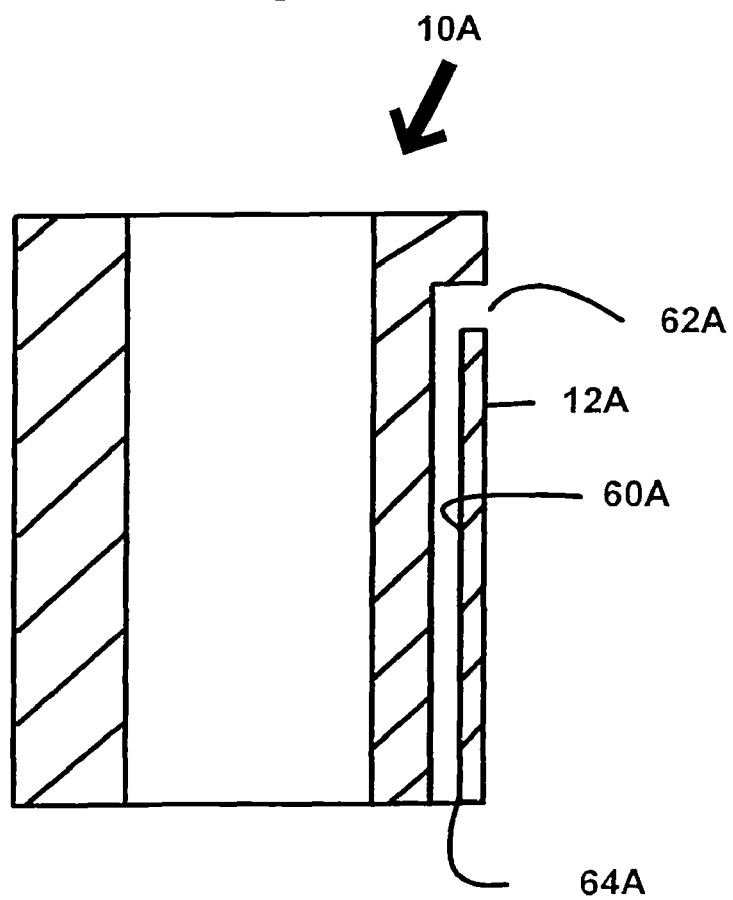
FIG. 15 is a front sectional view of the vacuum attachment of FIG. 14.

FIGS. 14 and 15 show a first alternative embodiment of an attachment 10A, which is the same as the first embodiment 10, except that there are no projections 33 in the lower collar, and instead the pipe 12A defines a separate, second conduit, in the form of an internal air conduit 60A, with an inlet 62A near the top of the pipe 12A and an outlet 64A at the bottom of the pipe 12A. As shown here, the pipe 12A is thick-walled, and the conduit 60A is defined within the thick wall. The window or windows (not shown) extend through a different part of the wall of the pipe so as not to interfere with the path 60A. It also would be possible for the pipe 12A to have thin, concentric, inner and outer walls, with the path 60A being a space between those walls, or for the pipe 12A to have thin, non-porous inner and outer walls with a porous material between them that provides the path 60A. In any case, in this embodiment, air flows into the inlet 62A, downwardly along the second conduit 60A, out the outlet 64A, and then into the open bottom inlet of the pipe 12A, up through the inside of the pipe 12A and out through the vacuum hose 11.

It is contemplated that this embodiment would also have a shuttle and a stop as in the previous embodiment. While this embodiment is shown schematically as having a relatively short pipe 12A, it should also be understood that the pipe 12A may be long enough to extend the full length of the reactor tube 52, so the attachment 10A may be used for removing all the catalyst from the reactor tube 52, if desired.

Figure 16:
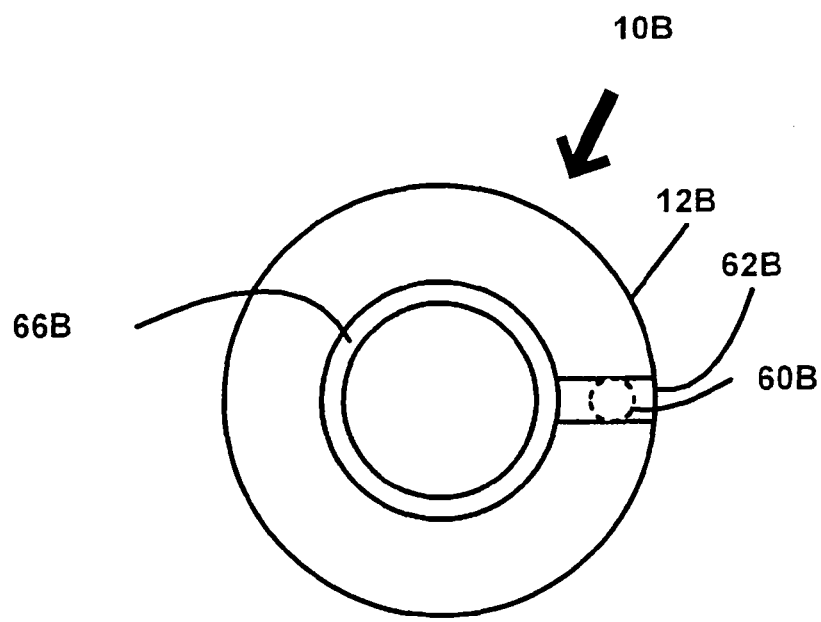
FIG. 16 is a top view of a second alternative vacuum attachment with the shuttle, slide and spring removed for clarity.
Figure 17:
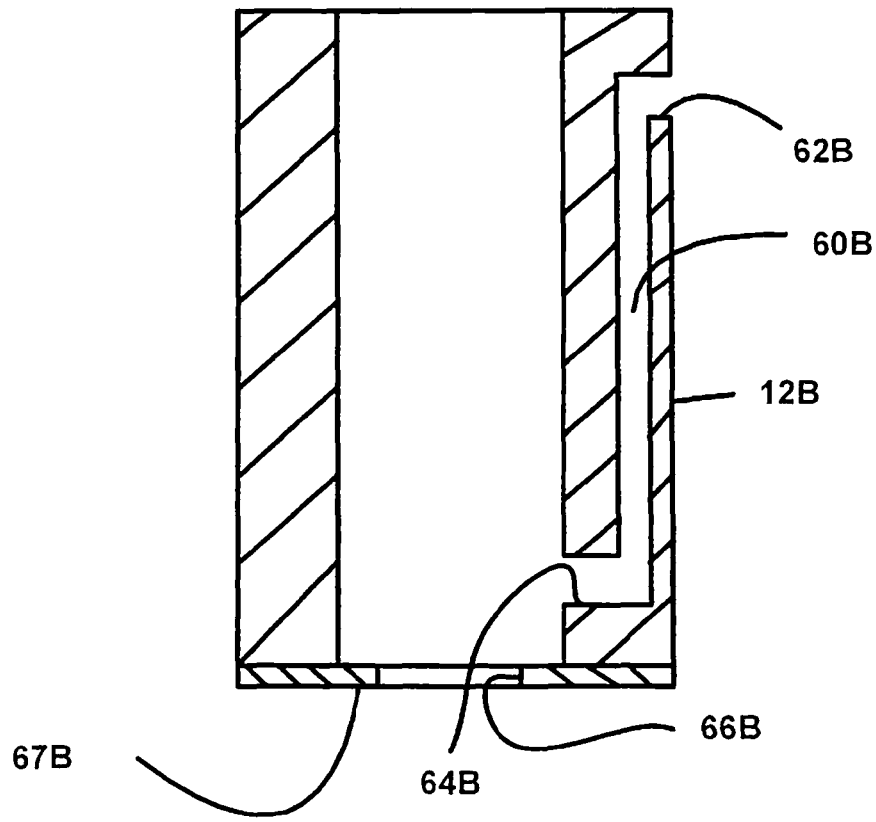
FIG. 17 is a front sectional view of the vacuum attachment of FIG. 16.

FIGS. 16 and 17 show a second alternative embodiment of an attachment 10B, which is very similar to the embodiment 10A of FIGS. 14 and 15, except that, in this embodiment, the outlet of the air conduit 60B is along the inside diameter of the pipe 12B, and there is a restriction (or smaller cross-sectional area portion) 66B at the inlet of the first conduit (the bottom end of the pipe 12B), which has a smaller cross-sectional area than the remainder of the first conduit. This smaller cross-sectional area inlet 66B is formed by a plate 67B that is secured to the bottom of the pipe 12B.

In this embodiment, air flows in through the inlet 62B, down the second air conduit 60B, out the outlet 64B of the second conduit 60B, which is adjacent the inlet 66B of the first or primary conduit, and then up through the interior of the pipe 12B, as particles are pulled upwardly through the opening 66B and through the pipe 12B. By providing a smaller cross sectional area at the inlet end of the pipe 12B than for the remainder of the pipe 12B, the opportunity for the bridging of particles within the pipe 12B is reduced. This is because once the particles have made it past the restriction 66B, they encounter the remainder of the pipe which has a constant, larger cross-sectional area. This facilitates the movement of the particles without bridging. It is also desirable for the remainder of the first conduit through the hose 11 and manifold 5 to the hopper to have a cross sectional area that is larger than the opening 66B, and preferably at least as large as the cross-sectional area of the pipe 12B for the same reason.

The outlet end 64B of the second conduit 60B is adjacent the inlet opening 66B of the pipe 12B, but in this case, it is inside the pipe 12B rather than outside. It is preferable for the outlet of the second conduit to be outside the pipe, as in FIG. 15, so it can be more effective in fluidizing the particles in the reactor tube. However, the outlet of the second conduit could alternatively be inside the pipe, as shown in FIG. 17. In either case, the air leaving the outlet of the second conduit will create turbulence at the inlet end of the pipe, which helps fluidize the particles, and it will provide air for entraining the particles and carrying them through the pipe 12B and through the rest of the first conduit.

It should be noted that the paths as shown in the conduit 60A (See FIG. 15) and in the conduit 60B (See FIG. 17) are open to ambient air at their inlet ends 62A, 62B, which are outside of the chemical reactor tube and remote from their respective outlet ends 64A, 64B. However, these second conduits 60A, 60B may alternately be supplied with pressurized gas at their inlet ends 62A, 62B, which may be air or some other gas, to aid in fluidizing the catalyst particles adjacent the bottom end of the vacuum attachments 10A, 10B as they approach the catalyst in the reactor tube 52.

To reiterate, the embodiments of FIGS. 15 and 17 define two separate conduits. The first conduit has its inlet at the bottom of the vacuum pipe and its outlet adjacent to the collection hopper that collects the vacuumed particles. The inlet is inserted into the top of the chemical reactor tube 52 (See FIGS. 11-13) and travels downwardly, vacuuming out solid catalyst particles 50 from the chemical reactor tube 52.

There is also a second flow path to convey a fluid from outside of the chemical reactor tube 52 to the inlet (the bottom end) of the vacuum pipe 12. In the embodiment of FIGS. 1-13, the second flow path is formed by an opening or gap that allows air to flow into the top of the reactor tube 52 and to flow down between the vacuum pipe 12 and the reactor tube 52. As described in the embodiments 10A and 10B, the second flow path 60A, 60B is formed by a separate conduit 62A, 62B, respectively. In still other instances, such as that depicted by the vacuum pipe 12* of FIGS. 24 and 25 (described in more detail below), the second flow path 60* is defined by a second conduit 96* fixed to the vacuum pipe 12*.

It should also be noted that the second conduit may be advantageously pressurized with a fluid (such as compressed air) to enhance the performance of the device. The external gas that flows through the second conduit makes up a substantial amount of the gas (preferably at least one-third of the gas and more preferably at least one-half of the gas) that leaves the reactor tube 52 through the first conduit.

Figure 27:
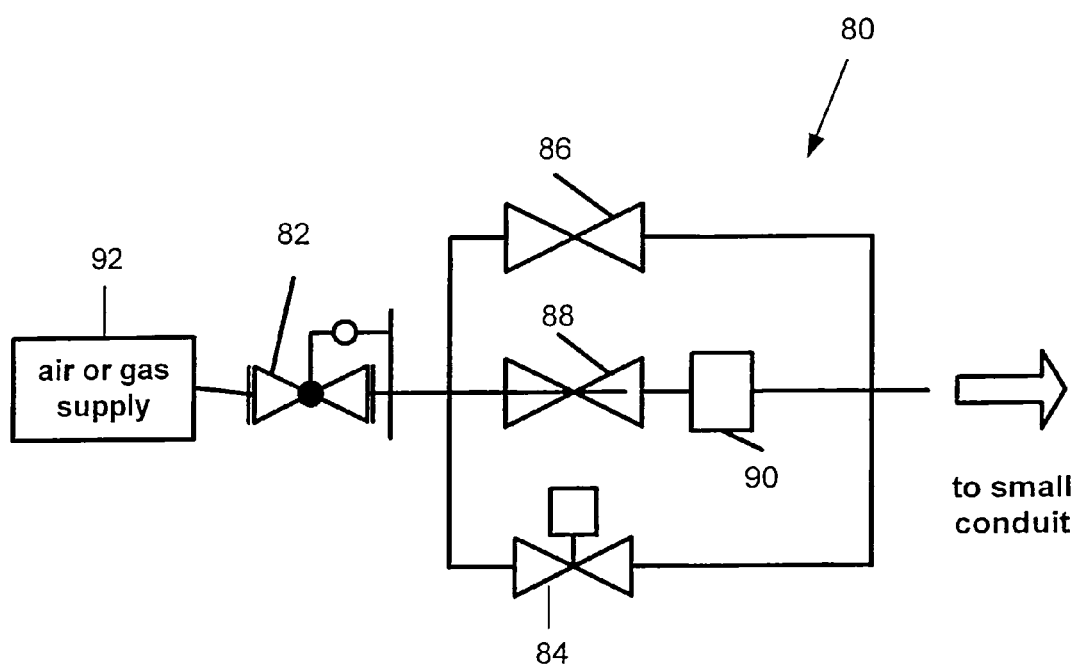
FIG. 27 is a schematic view of a valve manifold for use with any of the vacuum attachments shown in the previous figures.

FIG. 27 depicts a schematic of a valve manifold 80 which may be used to regulate the pressurized fluid flow into the second conduits 60A, 60B of the attachments 10A, 10B. The valve manifold 80 includes an air regulator 82, a solenoid valve 84 connected in parallel arrangement with a first manual valve 86 and with a second manual valve 88 and orifice 90. The pressure regulator 82 reduces the supply pressure available from the air or gas supply 92 to a pressure suitable for the application. The fluid supply may then be switched on automatically via the solenoid valve 84, or manually through the manual valve 86, or under controlled and known flow conditions through the valve 88 and orifice 90, to provide a source of pressurized fluid to the second conduits 60A, 60B (or to the second conduit of another embodiment).

Figure 18:
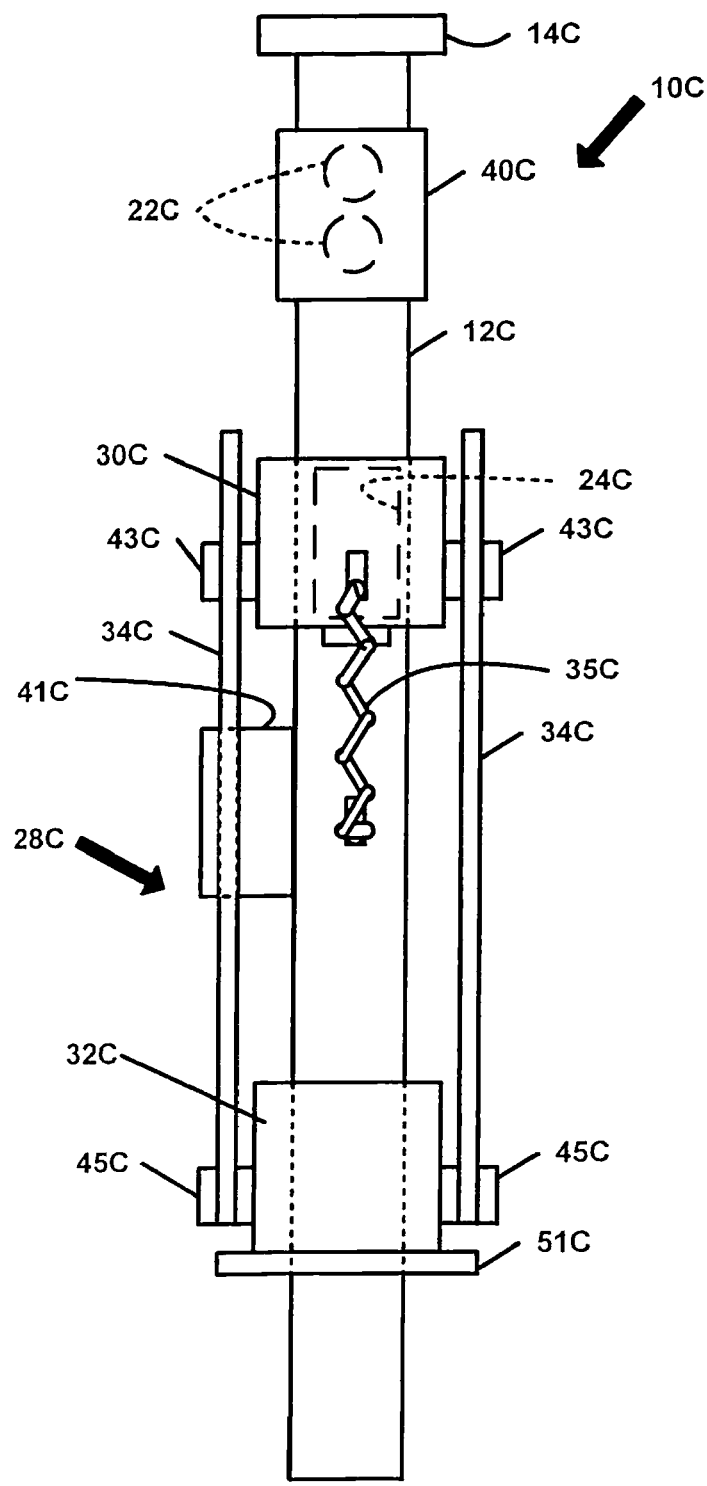
FIG. 18 is a schematic front view of another alternative embodiment of a vacuum attachment.
Figure 19:
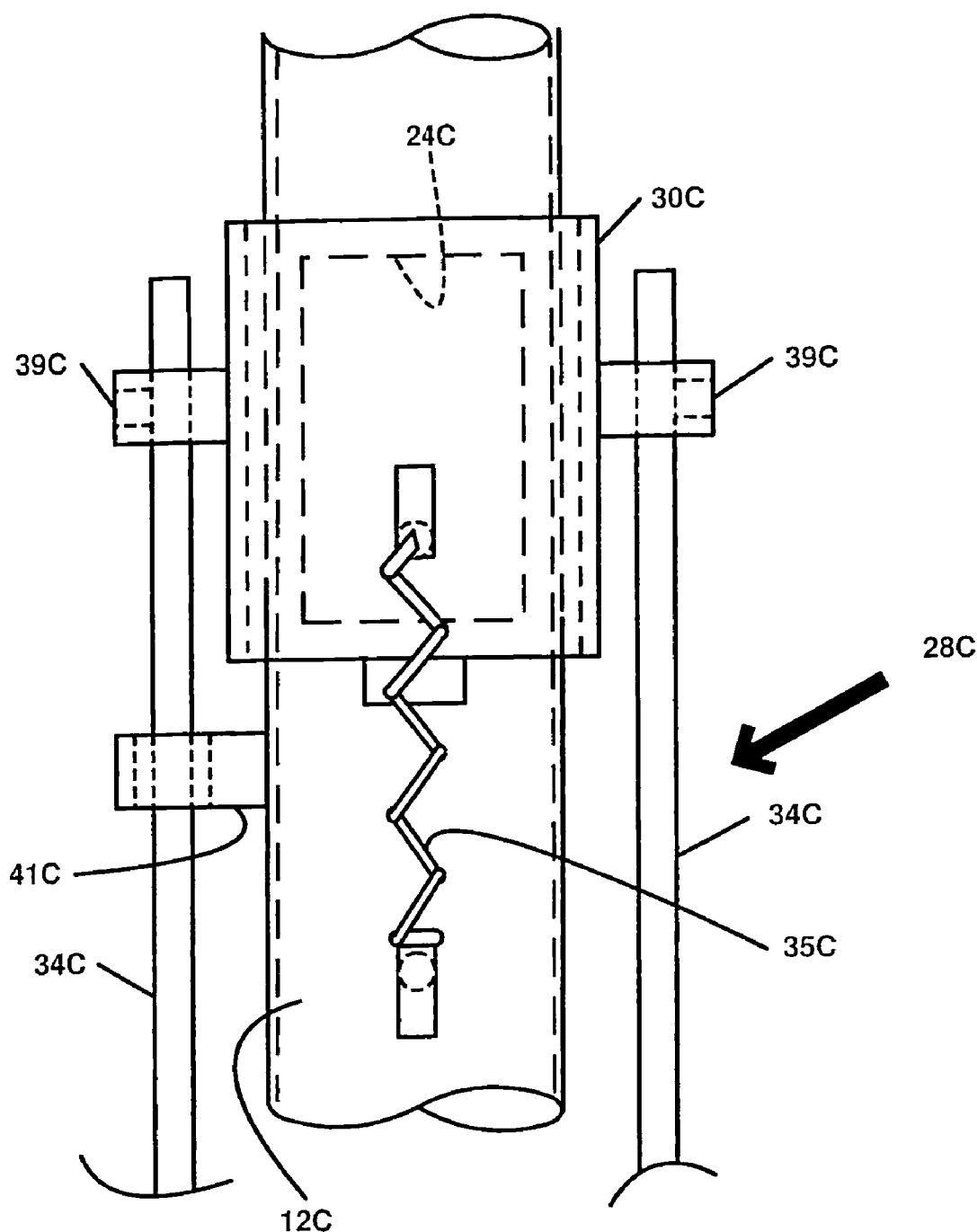
FIG. 19 is a broken-away enlarged view of the upper portion of the shuttle of the vacuum attachment of FIG. 18.
Figure 20:
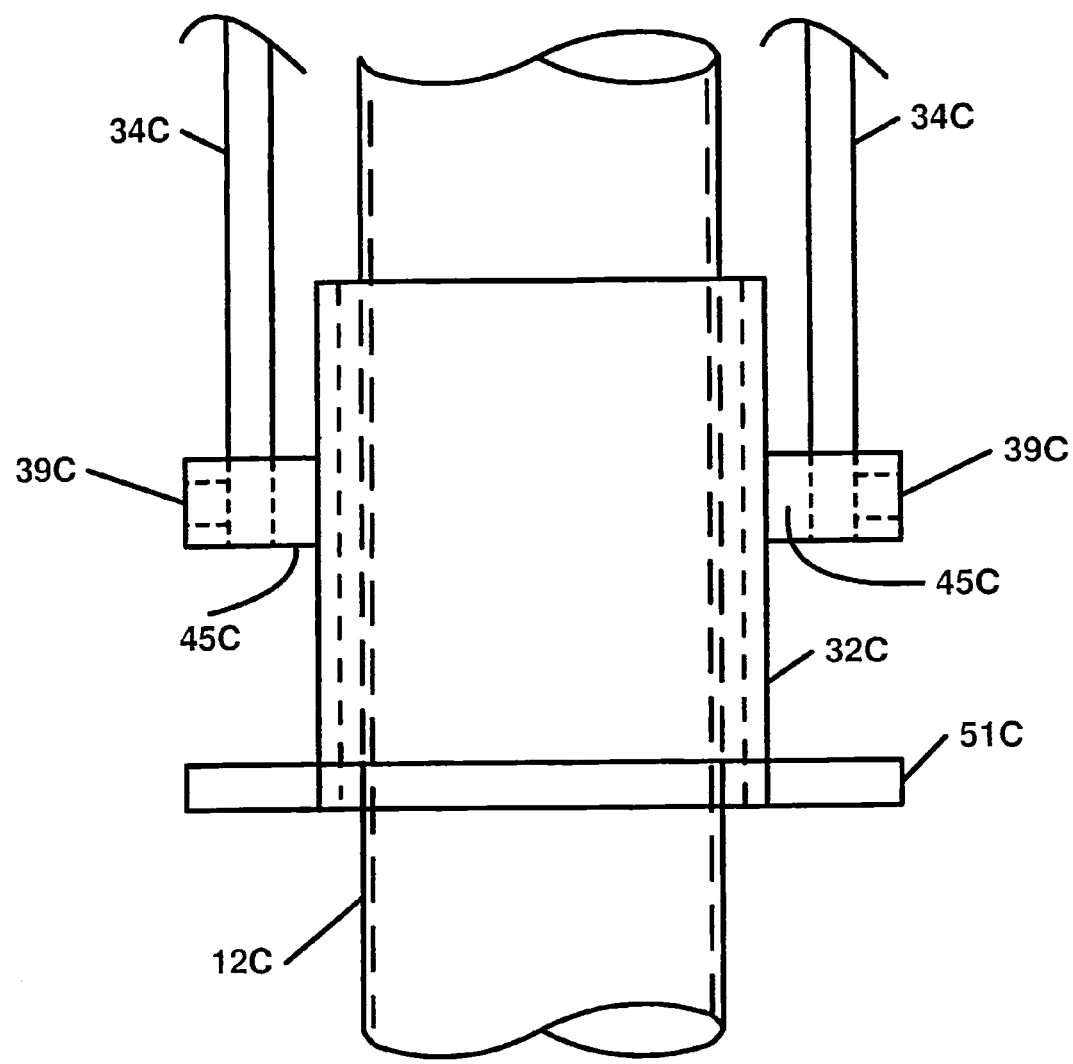
FIG. 20 is a broken-away enlarged view of the lower portion of the shuttle of the vacuum attachment of FIG. 18.

FIGS. 18-20 show another alternative embodiment of a vacuum attachment 10C. In this embodiment, as in the previous embodiments, the pipe 12C connects to a vacuum hose 11 at its top end 14C. There is a vacuum regulator 40C, which can be moved up and down to cover or uncover openings 22C in order to regulate the vacuum level applied through the attachment 10C. There is a shuttle 28C, which is adjustable in length. The shuttle 28C includes an upper collar 30C, a lower collar 32C, and two rods 34C, which fit through openings in projections 43C from the upper collar 30C and through openings in projections 45C from the lower collar 32C to cooperatively connect the upper and lower collars 30C, 32C together. There are set screws 39C (See FIGS. 19 and 20), which are used to fix the position of the rods 34C relative to the collars 30C, 32C. A guide block 41C (shown in FIGS. 18 and 19) is fixed to the main pipe 12C and defines an opening that slidably receives one of the rods 34C in order to guide the shuttle 28C as it moves up and down relative to the pipe 12C. The guide 41C also serves as a stop, with the upper collar 30C abutting the top of the guide 41C when the shuttle 28C is in its lowermost or "at rest" position, and the lower collar 32C abutting the bottom of the guide 41C when the shuttle 28C is in its uppermost position.

The spring 35C is connected to the upper collar 30C and to the pipe 12C, biasing the shuttle 28C downwardly, so that, when it is in the "at rest" or lowered position, the upper collar 30C covers the window opening 24C in the pipe 12C.

At the bottom of the lower collar 32C is a flange 51C, which abuts the top of the tube sheet 54 when the vacuum device 10C is used to vacuum catalyst out of a reactor tube 52. Except for the fact that in this arrangement the shuttle 28C is adjustable, it functions in the same manner as in the first embodiment 10. Namely, when the vacuum attachment 10C is first inserted into a reactor tube 52, the flange 51C rests on the tube sheet 54, and the upper collar 30C substantially closes off the lower window 24C, establishing a good vacuum level inside the vertical pipe 12C. As the vacuum attachment 10C is inserted deeper into the reactor tube 52, the flange 51C pushes up the lower collar 32C which is connected to the upper collar 30C via the rods 34C. Therefore, the upper collar 30C is also pushed up against the biasing action of the spring 35C, gradually uncovering more of the lower window 24C, which allows more ambient air to enter the pipe 12C, reducing the vacuum level inside the pipe 12C. As with the previous embodiments, the opening 24C is sized and the collar 30C is located so that, when the inlet of the vacuum tube 12C reaches a desired depth, the vacuum level is substantially reduced, so the device stops vacuuming solid particles out of the reactor tube.

FIG. 21 shows two of the vacuum attachments 10 rigidly connected together by means of upper and lower clamp assemblies 70, 72, which clamp onto their respective attachments 10 and hold them a fixed distance apart by means of rigid, adjustable length arms 74. The operator may adjust the length of the rigid arms 74 so the two or more vacuum attachments 10 align with respective two or more reactor tubes 52, in which case the operator may vacuum a plurality of tubes 52 at the same time, lowering the group of vacuum attachments 10 together as a single unit into their respective tubes 52 in a manner similar to the tube test device shown in U.S. Pat. No. 6,725,706, which is hereby incorporated herein by reference.

Figures 22, 23:
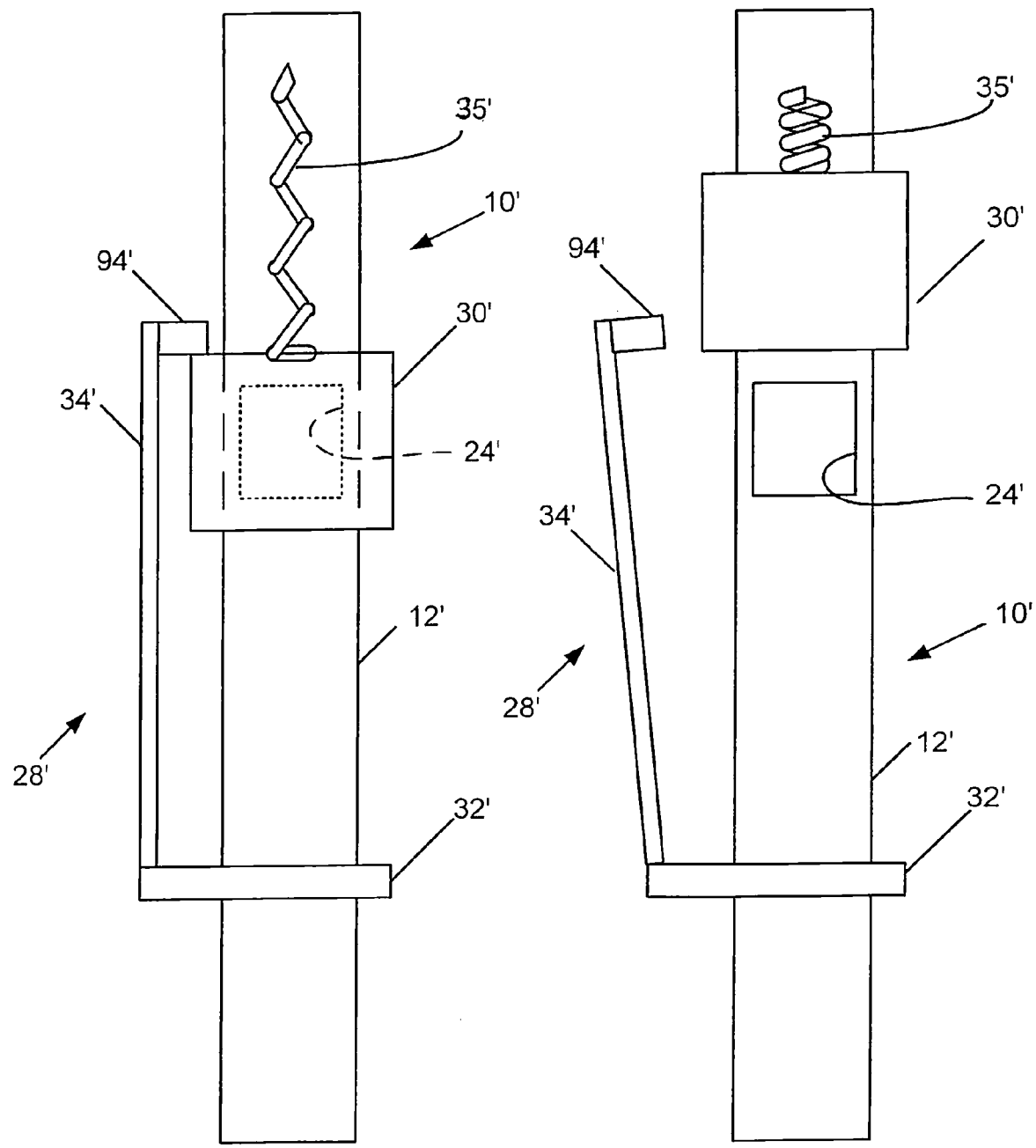
FIG. 22 is a front schematic view of another embodiment of a vacuum attachment, incorporating a trigger arm, shown here in the armed position.
FIG. 23 is a view similar to that of FIG. 22 but showing the trigger arm in the released position.

FIGS. 22 and 23 depict another embodiment of a vacuum attachment 10' made in accordance with the present invention. This is similar to the vacuum attachment 10 of FIG. 1, and 10C of FIG. 18, except that in these views only the shuttle mechanism 28' is shown; other details of the vacuum attachment 10' have been omitted for clarity.

Referring to FIG. 22, the vacuum attachment 10' includes a shuttle mechanism 28' with a lower collar 32', a swing-arm connecting rod 34' with a retaining finger 94', an upper collar 30', a biasing spring 35', and a pipe 12' defining a window opening 24'. In FIG. 22, the swing-arm connecting rod 34' is in the armed position, with the finger 94' engaging the top surface of the upper collar 30', holding the upper collar 30' in position against the biasing action of the biasing spring 35', which acts to pull the upper collar 30' upwardly. In this position, the upper collar 30 covers the lower window opening 24'.

Initially, as the tube 12' of the vacuum attachment 10' is inserted into a reactor tube 52, the lower collar 32' is above the tube sheet 54. The shuttle mechanism 28' remains in the armed position depicted in FIG. 22, with the lower window 24' closed off by the upper collar 30'. As the vacuum attachment 10' is pushed deeper into the reactor tube 52, the lower collar 32' approaches the tube sheet 54 until eventually it contacts the tube sheet 54. Further downward motion causes the lower collar 32' to move upwardly relative to the tube 12', which moves the swing-arm connecting rod 34', releasing the finger 94' from the top surface of the upper collar 30' and allowing the arm 34' and finger 94' to swing away, and allowing the biasing spring 35' to pull upwardly on the upper collar 30', uncovering the lower window 24' as shown in FIG. 23.

Ambient air is then able to rush into the pipe 12' to substantially reduce the vacuum level inside the pipe 12' (and the vacuum level at the inlet of the pipe 12') such that no more catalyst particles 50 are drawn out from the reactor tube 52.

FIGS. 24-27 depict another embodiment of a pipe 12* for the vacuum attachments described in this specification. This is similar to the pipe 12A of FIG. 15 and pipe 12B of FIG. 17, except that in this instance the second air flow path 60* is created by means of a smaller diameter second conduit 96* external to the pipe 12* and extending substantially along the length of the vacuum pipe 12*.

Figure 24:
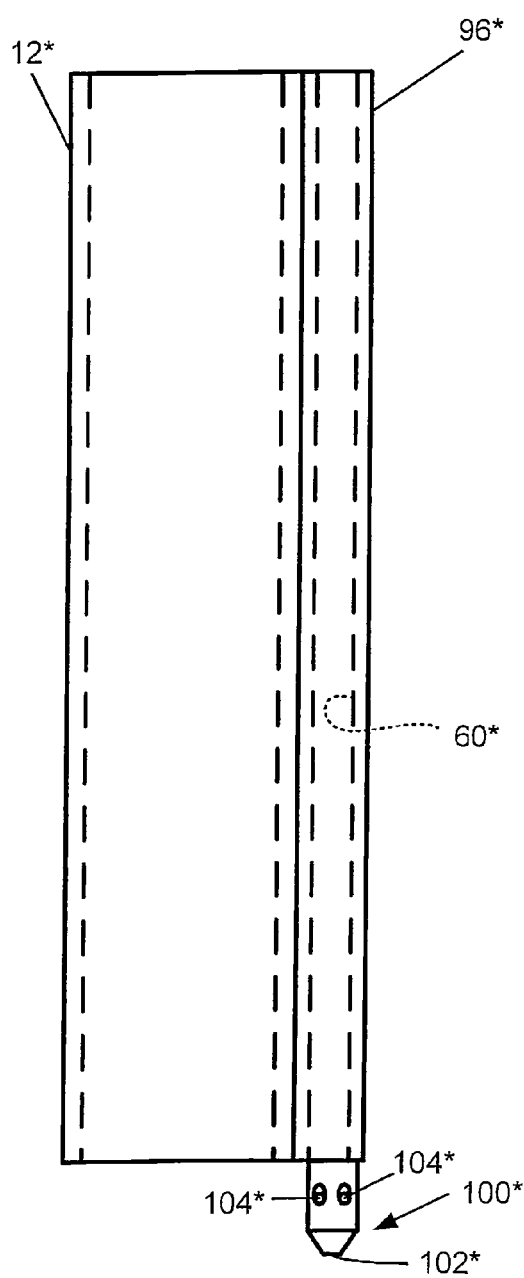
FIG. 24 is a front sectional view of another embodiment of the vertical pipe portion of the vacuum attachment, similar to that of FIGS. 15 and 17, which may be used in any of the vacuum attachments shown in the previous figures.
Figure 25:
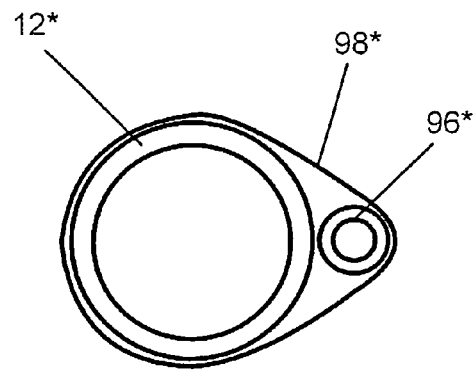
FIG. 25 is a plan view of the pipe of FIG. 24.

FIG. 25 shows the second conduit 96* extending alongside the larger diameter pipe 12*, and both of these conduits 12*, 96* are shown wrapped in a sheath 98*(which has been omitted for clarity from FIG. 24) to aid in keeping them tied together as they are inserted into the reactor tube 52. The sheath 98* may simply be strips of tape securing the conduits 12* and 96* together. The sheath 98* may also be made of a material such as polyvinylchloride, which is sold commercially as shrink tubing and which may extend the full length of the conduits 12*, 96*, if desired.

Of course, the combination of the two conduits 12*, 96* may also be manufactured as a single hose or pipe (not shown) which includes two or more separate, parallel conduits, wherein the second conduit(s) 96* may reside externally to the first conduit 12*(as shown in FIG. 25) or the second conduit(s) 96* may reside internally to the larger cross-section first conduit 12* (not shown). In any event, it is desirable to maximize the cross-sectional area of the larger conduit 12* in order to improve the catalyst particle carrying capacity of the larger conduit 12*. The cross-sectional area of the larger conduit 12* is substantially larger than the cross-sectional area of the smaller conduit 96*.

Of course, a restrictor, such as the restriction 66B of FIG. 17, may be installed at the bottom of the large conduit 12* of FIG. 24, or the conduit 12* may be manufactured with a tapered inlet end to provide a reduced diameter inlet for the first conduit, in order to reduce the opportunity for bridging of catalyst particles along the first conduit as described earlier.

Figure 26:
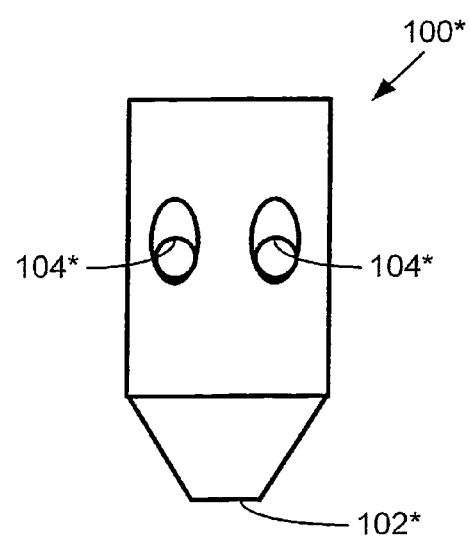
FIG. 26 is a detailed view of the nozzle of FIG. 24.

FIG. 26 depicts a nozzle 100* which is secured to the bottom end of the second conduit 96*. The nozzle 100* defines a bottom opening 102* in fluid communication with the flow path 60* of the small conduit 96*. This opening 102* blasts pressurized fluid directly into the catalyst particles 50 in the reactor tube 52 so as to assist in fluidizing the catalyst particles 50 for ease of their withdrawal through the vacuum tube 12*. This fluid flow also entrains the catalyst particles 50 and carries them into the vacuum pipe 12* as the fluid stream flows from the opening 102* in the nozzle 100* to the vacuum pipe 12*.

The nozzle 100* also defines a plurality of upwardly directed side openings 104* which are also in fluid communication with the flow path 60* of the second conduit 96*. These side openings 104* extend at an upward angle that is between 30 and 80 degrees from the horizontal. The fluid leaving those openings 104* at that upward angle exerts a downward force on the nozzle 100*(and by extension the small conduit 96* to which it is secured, and the vacuum pipe 12* which is also secured to the small conduit 96*), thereby pushing them downwardly into the reactor tube 52. The fluid flow exiting through the side openings 104* also aids in dislodging any catalyst particles 50 which may lodge between the pipe 12* and the reactor tube 52.

This embodiment of a large cross-section vacuum pipe 12* defining a first conduit along with a small cross-section conduit 96* defining a second fluid path may be used in any of the vacuum attachments described in this specification. Further-more, this vacuum pipe 12* with a small cross-section conduit 96* may be used as shown in FIG. 24, without any of the other items shown for the other vacuum attachments described above (such as the shuttle, and the upper and lower windows), particularly when it is intended to be used to quickly vacuum out all, or most, of the catalyst in a reactor tube, without concern for vacuuming to a specific outage level. Finally, this embodiment may also be used for the vacuum pipes 132, 134 in the automated vacuum device 100 described below.

FIGS. 28-41 depict an automated vacuum device 100 as disclosed in U.S. Provisional Application Ser. No. 60/914,551 filed Apr. 27, 2007, which is hereby incorporated herein by reference. It is possible to use one of the vacuum attachments, as described above, in conjunction with this automated vacuum device 100, by providing window openings and mounting shuttles 28 on the pipes 132, 134, if desired. In this embodiment, the shuttles 28 may contact the lower cross member 118 (described in detail below) of the automated vacuum device 100 instead of contacting the tube sheet.

On the other hand, it may be possible to eliminate some of the features described above for the vacuum attachments, such as the vacuum regulator 40 (See FIG. 1) and/or the shuttle 28 and its automatic vacuum-breaking feature of allowing air to enter through the window 24 when the desired outage level is reached, and replace these features with electro-mechanical interlocks as described below.

Figure 28:
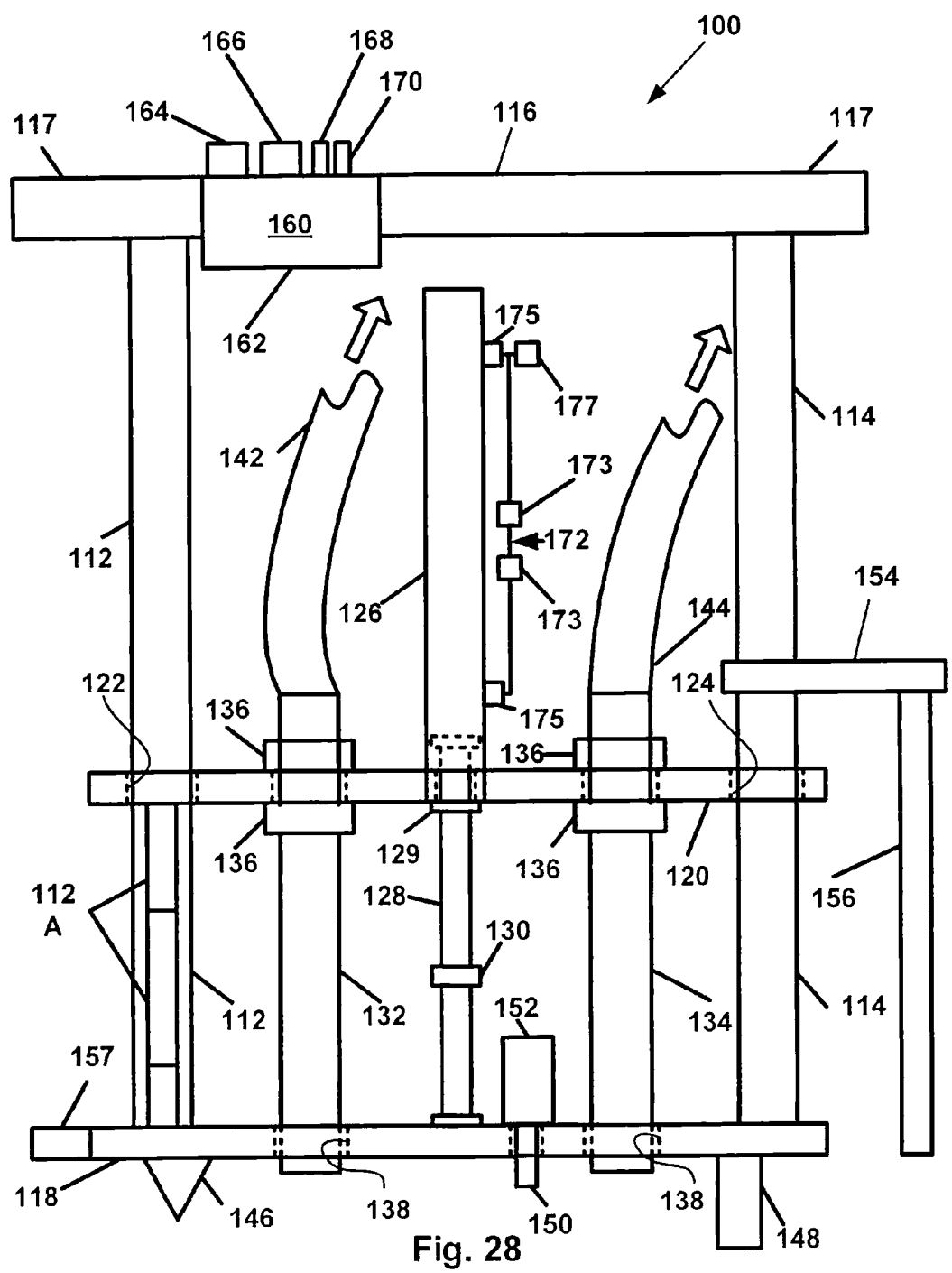
FIG. 28 is a schematic front view of an automated vacuum device made in accordance with the present invention, with the front and rear guard plates removed.
Figure 29:
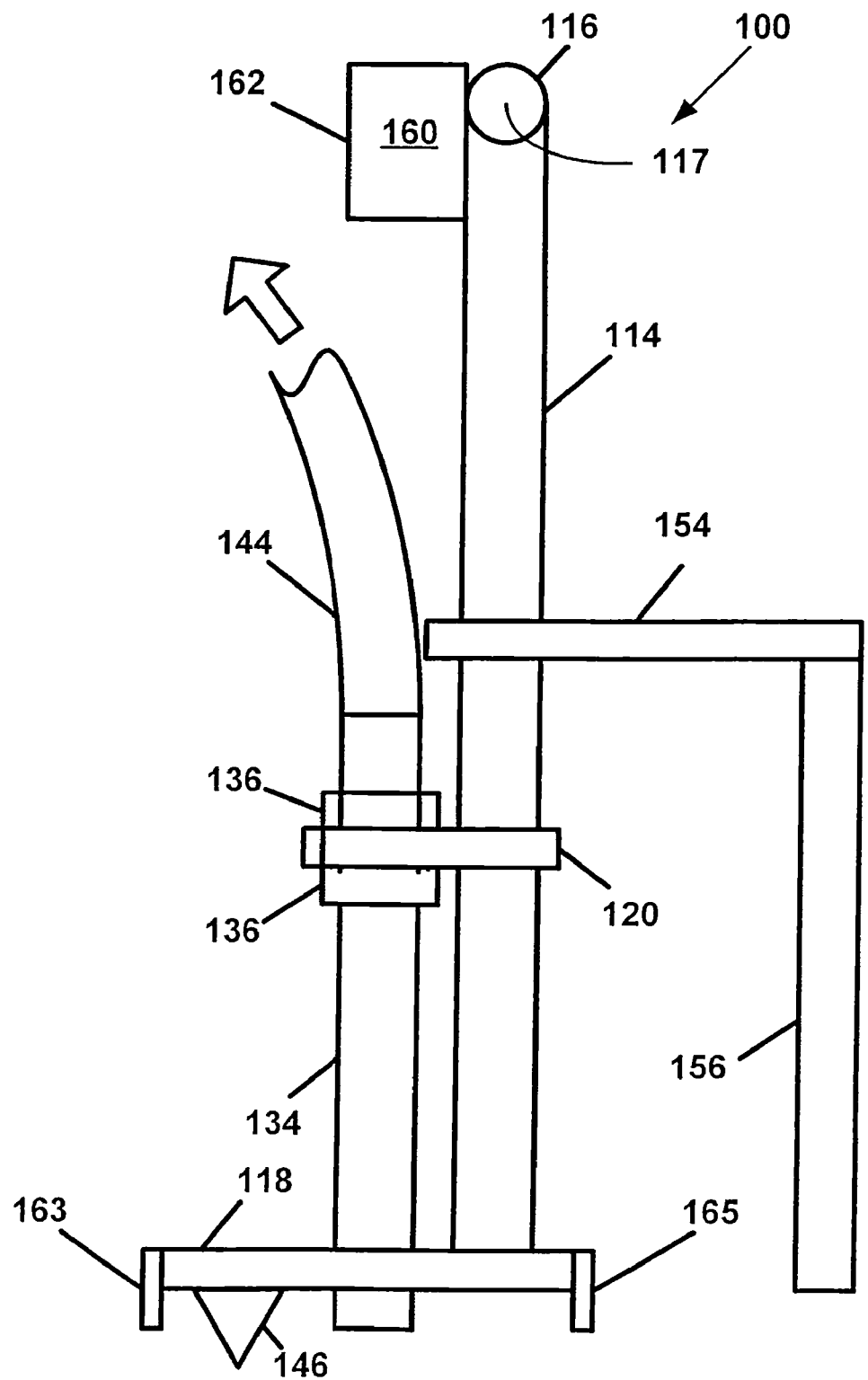
FIG. 29 is a side view of the automated vacuum device of FIG. 28 with the front and rear guard plates in place.

FIG. 28 is a schematic front view and FIG. 29 is a schematic side view of an automatic vacuum device 100. The device has a rigid rectangular frame, made up of left and right structural vertical tubes 112, 114 and upper and lower cross members 116, 118, which are fixed to the vertical tubes 112, 114. The upper cross member 116 includes two handles 117, which can be used to pick up the device 100. The left tube 112 has a colored and graduated scale 112A, which is used to indicate or measure the position of the upper plate 120 (and of the vacuum tubes 132, 134) relative to the frame.

An upper plate 120 has left and right openings 122, 124, which slide over the left and right tubes 112, 114, respectively, allowing the upper plate 120 to move up and down relative to the rectangular frame. An air cylinder 126 is fixed to the center of the upper plate 120, and a piston rod 128 projects downwardly out of the air cylinder 126 and through the upper plate 120, with the bottom end of the piston rod 128 being fixed to the lower cross member (or lower plate) 118. A collar 130 is fixed to the piston rod 128 by means of a set screw (not shown) to create a mechanical stop that limits the travel of the piston rod 128.

Left and right vacuum pipes 132, 134 are fixed by collars 136 to the upper plate 120 and project through openings 138 in the lower plate 118, so the left and right vacuum pipes 132, 134 move up and down with the upper plate 120 relative to the frame. At their top ends, the vacuum pipes 132, 134 are connected to hoses 142, 144, which are connected to a vacuum line to form an elongated conduit, as will be described later.

Projecting downwardly from the bottom surface of the lower plate 118 are fixed pins 146, 148, which are used to locate the device 100 relative to the tube sheet of the chemical reactor, as will be described later. Also projecting downwardly from the bottom surface of the lower plate 118 is a spring-loaded pin 150 connected to a switch 152, which indicates to the control system whether the lower plate 118 is resting on the tube sheet of the reactor. When the lower plate 118 is resting on the tube sheet of the reactor, the spring-loaded pin 150 is retracted, closing the switch 152.

A projection 154 is clamped onto the tube 114 and supports a leg 156, which helps the device 100 stand upright on the tube sheet. The projection 154 and leg 156 may be removed very easily if desired.

Mounted on the top cross member 116 is a box 160, which houses a computer or processor 162, a start switch 164, a potentiometer 166, a power lamp 168, and a status lamp 170.

The air cylinder 126 receives pressurized air from an air supply 172, such as a hose coming from an air compressor. There are solenoid valves 173 and flow control valves 175 and a pressure switch 177 which communicate with the processor 162 to control the air flow into the cylinder 126, which controls the movement up and down of the air cylinder 126. Since the air cylinder 126 is connected to the upper plate 120, and the piston rod 128 is fixed to the bottom plate 118, extending and retracting the piston rod 128 causes the air cylinder 126 and the upper plate 120 to move up and down relative to the frame, which also causes the vacuum pipes 132, 134 to move up and down relative to the frame (and relative to the reactor tubes 52).

Figure 30:
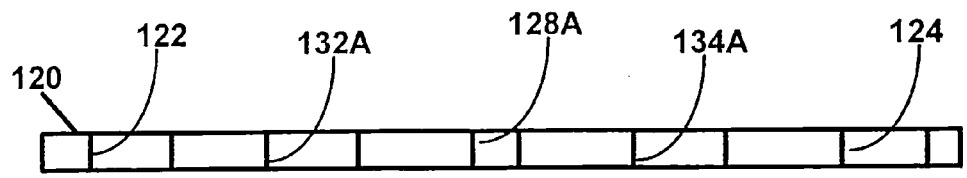
FIG. 30 is a front view of the upper plate of the device of FIG. 28.
Figure 31:
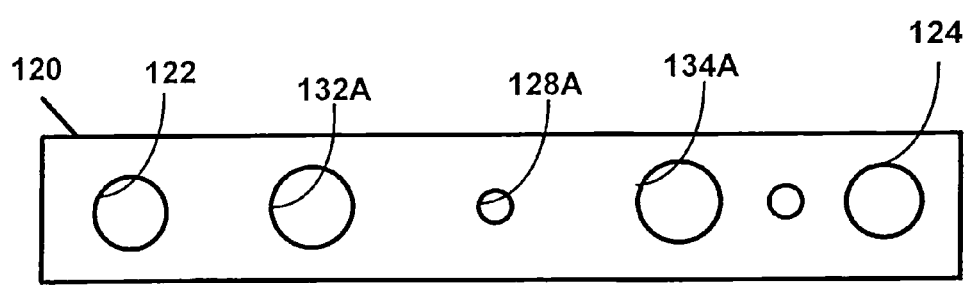
FIG. 31 is a top view of the upper plate of FIG. 30.

FIGS. 30 and 31 show more details of the upper plate 120, which is a generally flat plate with several holes through it. The holes 122, 124 receive the left and right framework tubes 112, 114, respectively. The holes 132A, 134A receive the left and right vacuum pipes 132, 134, respectively. A central hole 128A receives the piston rod 128 and is used to fix the air cylinder 126 to the upper plate 120 by means of a nut 129, which is shown in FIG. 28.

Figure 32:
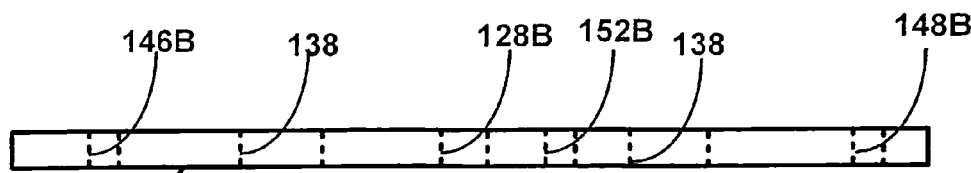
FIG. 32 is a front view of the lower plate of FIG. 28.
Figure 33:
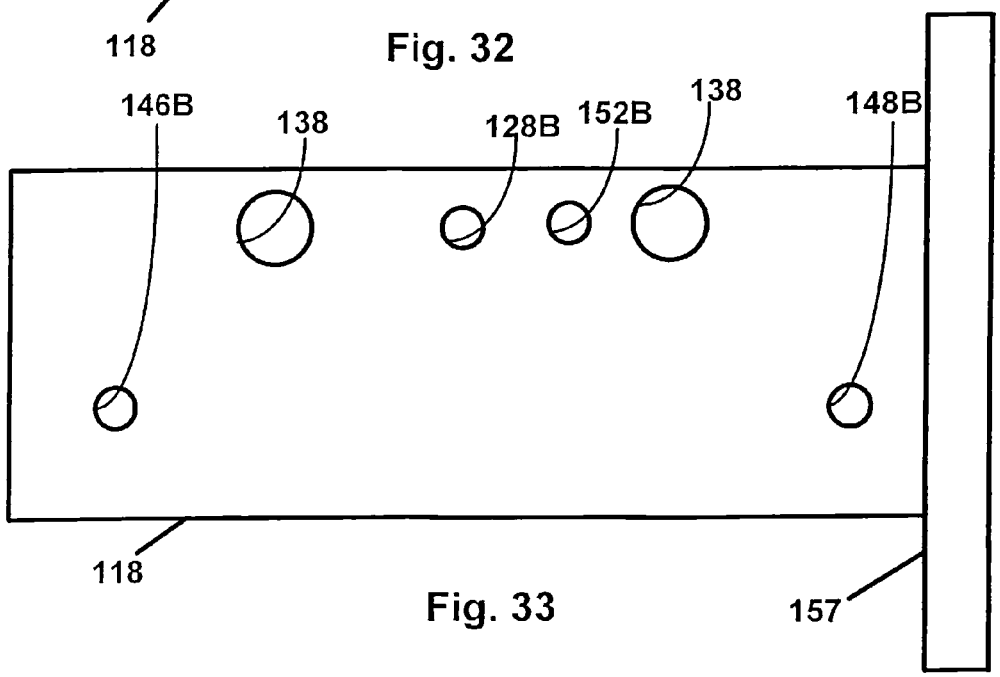
FIG. 33 is a top view of the lower plate of FIG. 32.

FIGS. 32 and 33 show more details of the lower plate 118, which has holes 146B, 148B to secure the pins 146, 148, respectively. Holes 138 receive the vacuum pipes 132, 134. Hole 128B is used to secure the piston rod 128 to the bottom plate 118. Hole 152B receives the pin 150 and is used to secure the switch 152 to the bottom plate 118.

Figure 40:
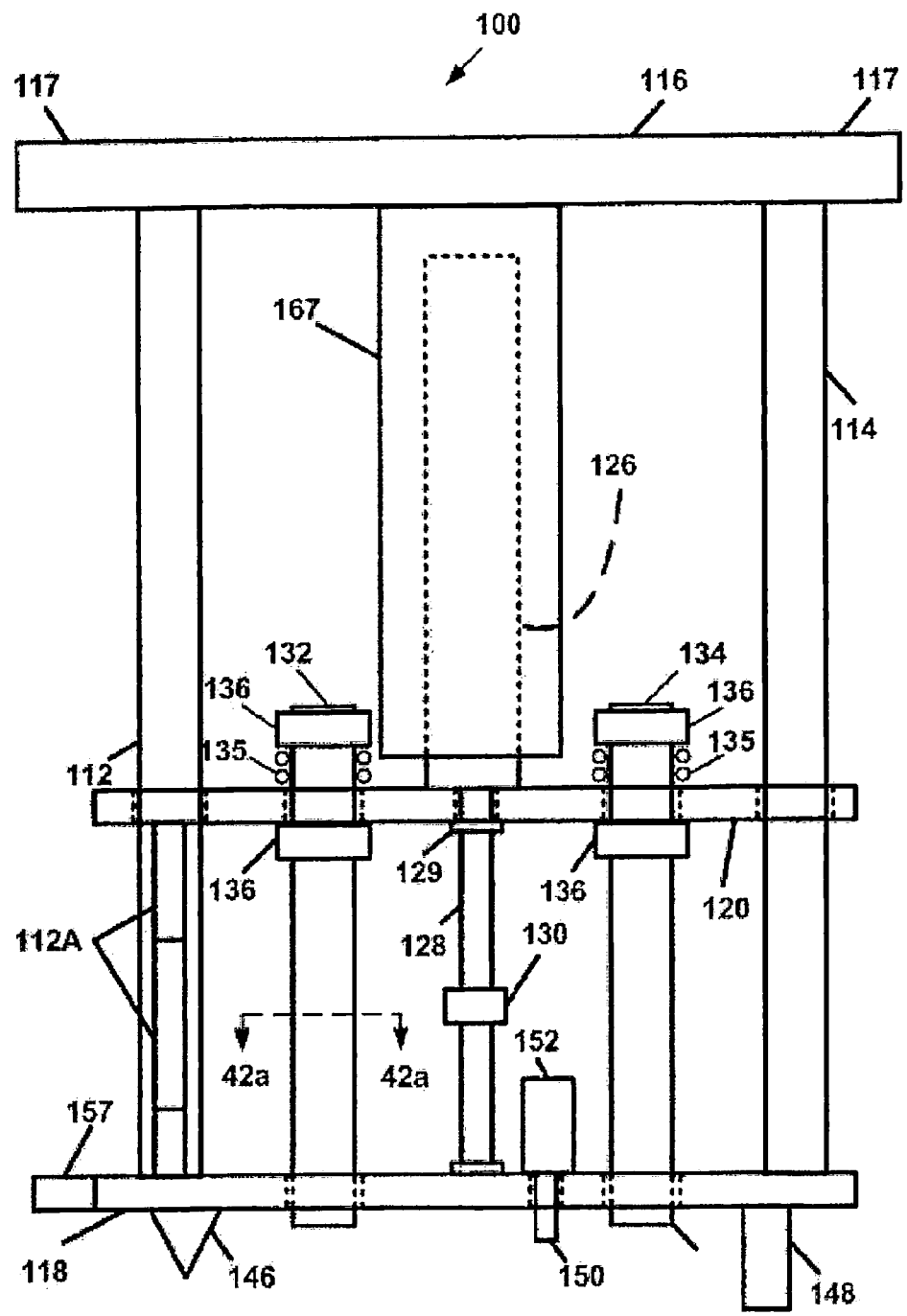
FIG. 40 is the same view as FIG. 28 but with a guard in place over the air cylinder and incorporating a spring between the lower collar and the upper plate.

FIG. 29 also shows front and rear guard plates 163, 165, respectively (these have been omitted from FIG. 28 for clarity) to protect the operator as the vacuum pipes 132, 134 move downwardly into the reactor tubes. FIG. 40 also shows a guard 167 to protect the air cylinder 126 from being bumped accidentally during operation of the device 100.

Figure 41:
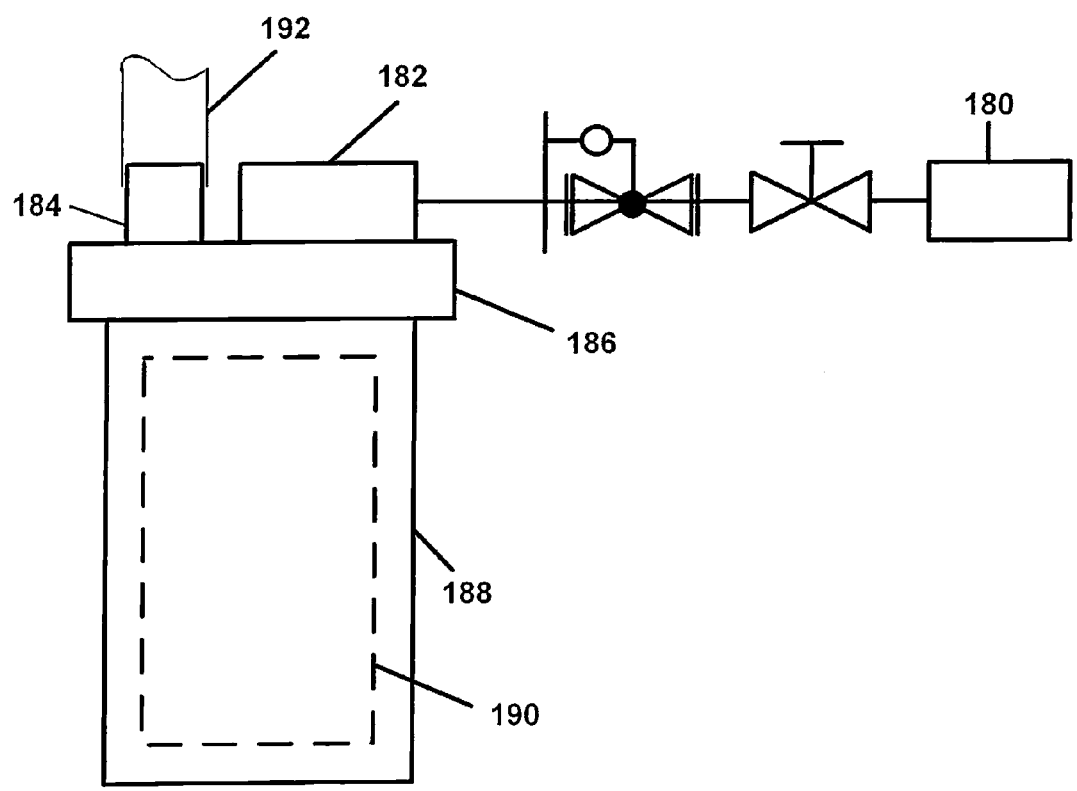
FIG. 41 is a schematic view of a vacuum source that provides the vacuum for the automated vacuum device of FIG. 28.

FIG. 41 shows one manner in which vacuum may be provided to the device 100. In this example, the vacuum is created by compressed air from an air compressor 180 passing through a venturi 182 to create a vacuum. The venturi 182 and the port 184 to be connected to a vacuum hose 192 are mounted on a lid 186, which closes off the top of a drum 188, which has a rubber liner 190 to catch the particles that are vacuumed up.

Figure 39:
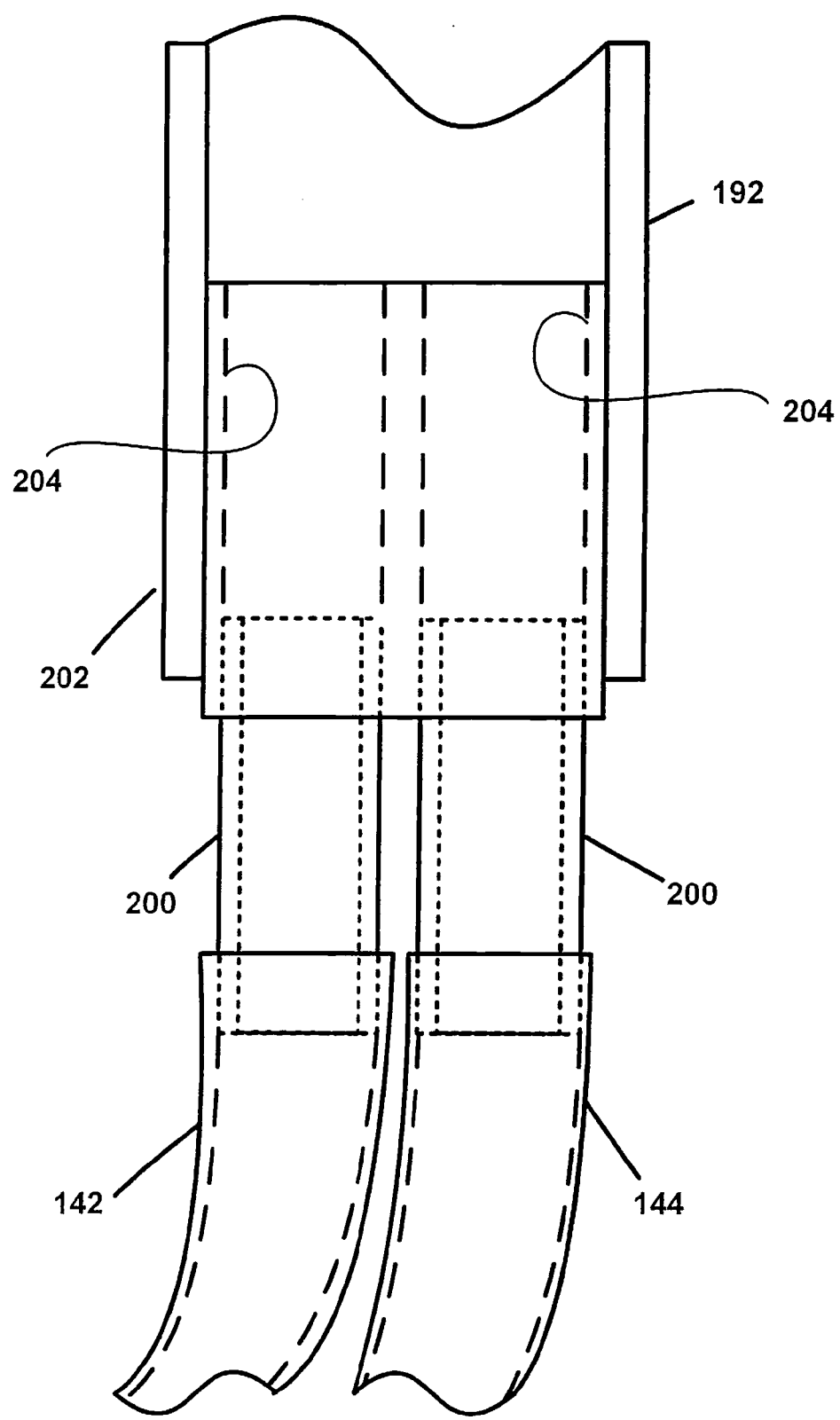
FIG. 39 is a schematic front view showing the hoses from the automated vacuum device of FIG. 28 connected to a vacuum hose through the tubes and fixture of FIGS. 35-38.

FIG. 39 shows the vacuum hose 192 (See FIG. 41), which is coming from the port 184 on the lid 186 of the drum 188, and which connects to the hoses 142, 144 from the automatic vacuum device 100 (See FIG. 28). The hoses 142, 144 from the device 100 mount over tubes 200, which extend into holes 204 in a common vacuum fixture 202.

Operation of the Device:

To operate the device, the operator connects the hoses 142, 144 to the vacuum source and then picks up the device 100 by the handles 117 and carries it to the desired location on the tube sheet of the chemical reactor. The pins 146, 148 are inserted into two of the reactor tubes, which causes the vacuum pipes 132, 134 to be aligned with two other reactor tubes. The central axes of the vacuum pipes 132, 134 are held in a vertical position and are aligned with the central axes of the respective chemical reactor tubes. (To see the layout of a vertical tube chemical reactor, see U.S. Pat. No. 6,725,706, which is hereby incorporated herein by reference.)

Figure 42A:
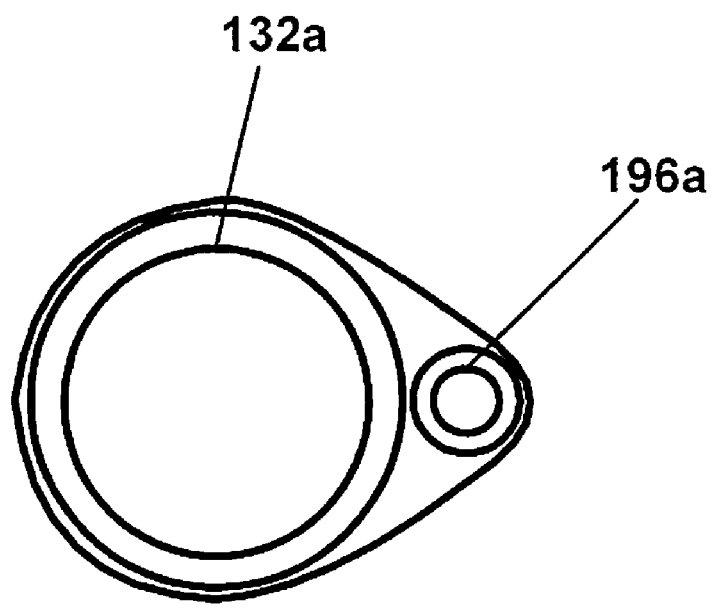
FIG. 42a is a view taken along the line 42a-42a of FIG. 40.
Figure 42B:
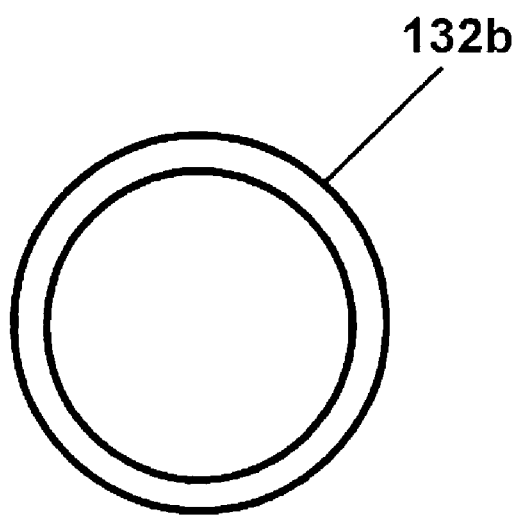
FIG. 42b is the same view as 42a but for an alternative embodiment.

The vacuum pipes 132, 134 are sized to have a large enough inside diameter to permit the catalyst to flow freely. Preferably, the inside diameter of the vacuum pipe 132, 134 is larger than the largest dimension of the catalyst and less than three times the largest dimension of the catalyst. If the vacuum pipe 132, 134 does not include a second conduit, as in the embodiment of a pipe 132b shown in FIG. 42b, then the outside diameter of the vacuum pipe 132, 134 preferably is 40-60% of the inside diameter of the reactor tube 52 in order to leave a substantial space between the vacuum pipe and the inside wall of the reactor tube, to provide an air flow path from outside the reactor into the top of the reactor tube 52, so air can pass down into the reactor tube to be vacuumed up through the vacuum pipe along with the catalyst. If a second conduit is provided outside the pipe, as with the pipe 132a of FIG. 42a, then the largest dimension of the combined conduits 132a, 196a can be very close to the inside diameter of the reactor tube 52. Also, if a second conduit 60A, is provided within the outside diameter of the pipe as in FIG. 14 or FIG. 16, then the outside diameter of the pipe can be very close to the inside diameter of the reactor tube 52, since the outside fluid will pass through the second conduit 60A, 60B, 196a (or other second conduit).

It is preferred to inject pressurized gas through the second conduit, in which case the pressure of the gas in the second conduit is at a higher pressure than ambient (meaning at a higher pressure than the pressure of the air surrounding the reactor). For example, compressed air from the compressor 180 of FIG. 41 may be connected to the remote end of the second conduit so it is injected through the second conduit and exits the second conduit adjacent the first end of the vacuum pipe. This pressurized gas helps fluidize the particles in the reactor tube 52 and entrains the particles to make it easier to vacuum the particles into and through the respective vacuum pipe 132, 134.

While it is preferred for the gas in the second conduit to be at a higher pressure than ambient, it may also be the case that the inlet end of the second conduit is open to the ambient air, and the vacuum applied at the outlet of the vacuum conduit is used to pull air through the second conduit.

The bottom plate 118 of the device 100 rests on the top surface of the tube sheet of the reactor, which causes the spring-biased pin 150 to retract, indicating to the controller that the device 100 is in position, resting on the tube sheet.

Figure 34:
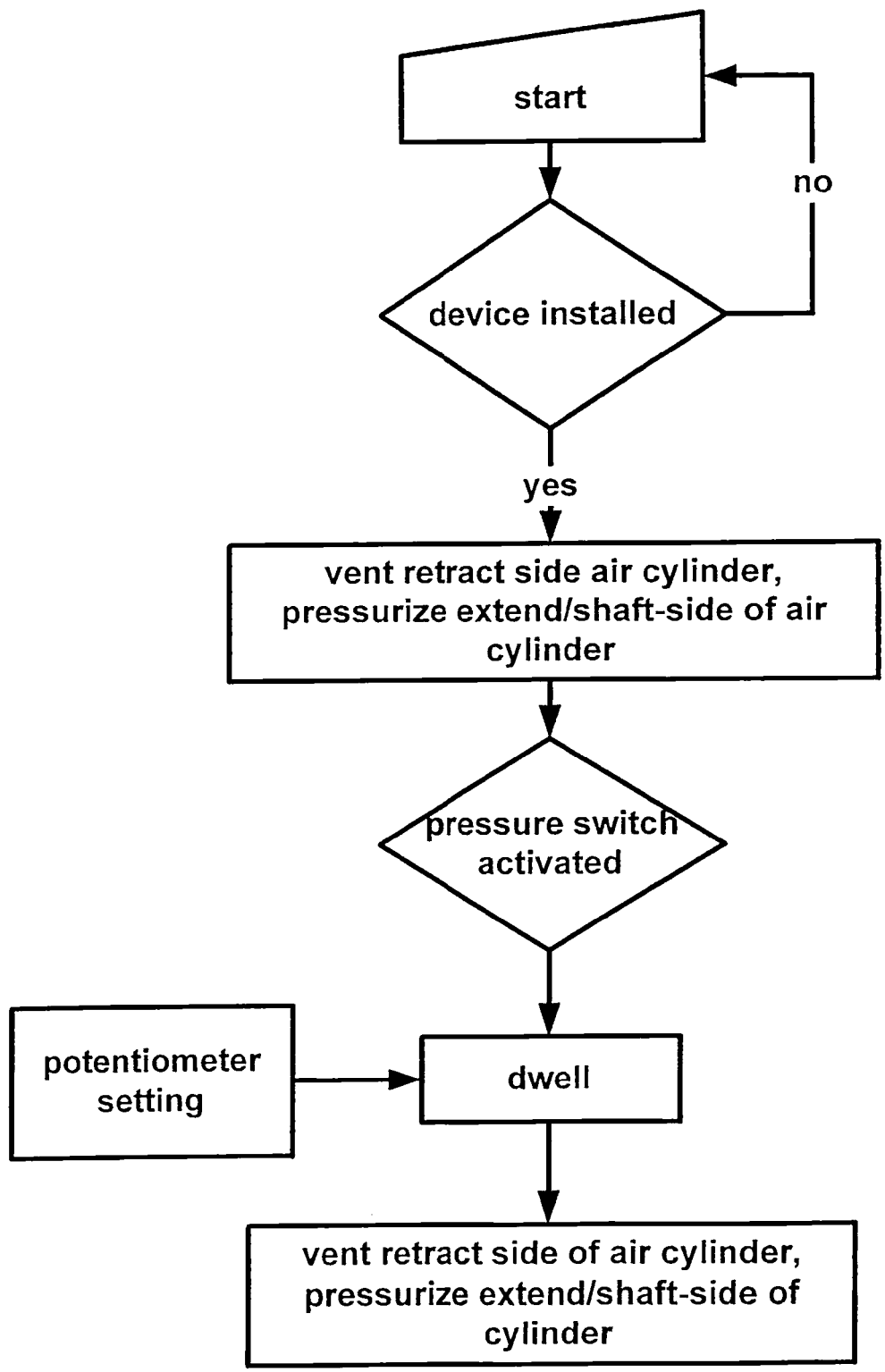
FIG. 34 is a flow diagram for the operation of the device of FIG. 28.

Looking now at FIG. 34, once the device 100 is in position on the tube sheet, standing independently, the operator activates the start switch 164 mounted on the upper cross member 116, which begins an automated sequence of events. First, the processor 162 checks to see whether the device is installed (whether the pin 150 is retracted). If so, the processor 162 activates the valves on the air cylinder 126 to retract the piston rod 128 into the air cylinder 126, causing the upper plate 120 to move downwardly, and moving the vacuum pipes 132, 134 downwardly at a controlled rate into their respective reactor tubes. Once the nut 129 on the upper plate 120 contacts the collar 130 on the piston rod 128, the upper plate 120 cannot move down any further. (The collar 130 creates a mechanical stop, and its position can be adjusted by loosening the set screw, sliding the collar 130 to the desired height on the piston rod 128, and then tightening the set screw.) At that point, the pressure in the air cylinder 126 builds up, and the pressure switch 177 on the flow control valve 175 for the air supply 172 switches, indicating to the processor 162 that the vacuum pipes 132, 134 have reached their extended positions. The computer 162 then allows the vacuum pipes 132, 134 to dwell at that extended position for a desired period of time, to ensure that the particles within the reactor tube have been vacuumed out to the desired level. The dwell time may be from one second to fifteen seconds, or whatever time period is found through testing to ensure that the particles will be removed to the desired outage level.

The processor 162 also may be programmed to gradually or instantaneously reduce the vacuum level in the pipes 132, 134 by shutting down the vacuum source, by closing off valves to the vacuum conduit, or by opening valves to allow air to enter the pipes 132, 134 to break the vacuum. If the pipes 132, 134 incorporate some version of the shuttle 28 (See FIG. 1, for instance), then the vacuum level is automatically reduced when the desired outage level is reached by the shuttle 28 moving to a position that uncovers a window opening in its respective pipe 132, 134.

Once the programmed dwell time has been completed, the processor 162 controls the valves 175 on the air supply 172 to extend the piston rod 128, raising the upper plate 120 and lifting the vacuum pipes 132, 134 out of their respective chemical reactor tubes.

Once the pins 146, 148 have been inserted into their respective reactor tubes, and the operator hits the start switch 164, the operation is entirely automated. This enables the operator to operate two or more machines at a time.

It may be desirable to provide a spring 135 (See FIG. 40) between the bottom collars 136 and the upper plate 120 so that, if the vacuum tubes 132, 134 encounter a restriction in the reactor tube, it will cause the spring to compress, and will cause the lower plate 118 to lift up off of the tube sheet, allowing the spring-biased pin 150 to extend. This signals the processor 162 that there is a problem, and the status lamp 170 will light up to indicate the problem to the operator. The operator can then look at the device to see which spring 135 is compressed, which will let the operator know which pipe is encountering the restriction and needs further attention.

The particles that are vacuumed out of the reactor tubes pass through the respective pipes 132, 134, through the respective hoses 142, 144 and connectors 200, and through the hose 192 into the rubber-lined drum 188 (See FIG. 41), where it is captured. The vacuum pressure is carefully regulated. In this particular case, the pressure at the drum 188 is maintained at 7 psia plus or minus 2 psi, to ensure that the particles are vacuumed out to the same outage level every time.

The lid 186 has a vacuum gauge attached to measure the vacuum in the drum 188. The operator can observe the vacuum gauge and adjust the regulator to adjust the amount of vacuum in the drum 188. Each of the vacuum pipes 132, 134 has a vacuum gauge (a pressure gauge) to permit the operator to observe the vacuum in each pipe to indicate whether there is an obstruction and to indicate when particles are is moving through them as well as when they are clear or clogged. These vacuum gauges also permit the operator to adjust the regulator valve to achieve the desired vacuum in the vacuum pipes 132, 134.

While an air cylinder is used here, other known means for automated, controlled movement of the vacuum pipes are also known and could be used, such as a motor-driven screw, a motor-driven gear, a hydraulic cylinder, and other known automated driving mechanisms.

In addition to being used to vacuum particles out of the top of a reactor tube to achieve the desired outage or open space at the top of the tube as described above, this vacuum device 100 may be used for other purposes. For example, it may be made long enough to reach the bottom of the reactor tube in order to completely empty catalyst from the reactor tube. In that case, it may be desirable to mount a brush on the vacuum pipe a bit beyond the inlet opening at the end of the vacuum pipe in order to brush the inside wall of the reactor tube and clean the reactor tube as the particles are being vacuumed out.

It also may be desirable to blow air or other gas into the bottom of the reactor tube as particles are being vacuumed out the top using this device or any of the other devices described above. In order to blow air into the bottom of the reactor tube, a device such as that shown in U.S. Pat. No. 6,725,706 may be used, providing an injector tube that seals against the inside of the bottom of the reactor tube and that injects pressurized gas at the bottom of the reactor tube. In that case, the number of operating tubes on the device that is used for blowing into the bottom preferably would be the same as the number of operating vacuum pipes being used for vacuuming at the top, so the numbers would match up and the same reactor tube that is being blown into at the bottom would be getting vacuumed out from the top.

The device that is used to blow gas into the bottom of the reactor tubes would seal against the inside wall of the reactor tubes and then blow gas into the bottom of the tubes, while the vacuum conduits of the device described above would be used to vacuum up catalyst from the top of the reactor tube.

Since the gas that is blown into the bottom of the reactor tube (or tubes) causes particles and dust to be blown out the top of the reactor tube, it is preferred that the vacuum device that is used at the top provide some type of collar that rests on the top tube sheet in order to provide substantial coverage or sealing of the top of the reactor tube to ensure that the dust and particles are vacuumed through the vacuum hose rather than leaking out and making a mess in the reactor. In the embodiment of FIG. 40, the lower plate 118 serves as a collar that rests on the top tube sheet, and the close fit between the vacuum pipes 132, 134 and the lower plate 118 provide substantial sealing at the top of the reactor tube. In the embodiment of FIG. 1, the collar 32 rests on the top tube sheet, and the close fit between the collar 32 and the vacuum pipe 12 provide a substantial seal at the top of the reactor tube. In the embodiment of FIG. 18, the collar portion 51C rests on the top tube sheet and, together with the pipe 12C provides a substantial seal at the top of the reactor tube. In the embodiment of FIG. 22, the collar portion 32' rests on the tube sheet, and its close fit with the pipe 12' provides a substantial seal at the top of the reactor tube.

FIGS. 43-46 show another alternative embodiment of a vacuum device 310 that is intended to be used for unloading the particles from reactor tubes when gas is blown in from the bottom of the reactor tube. This vacuum fixture 310 differs from the others in that it does not insert anything into the top of the reactor tubes.

Figure 43:
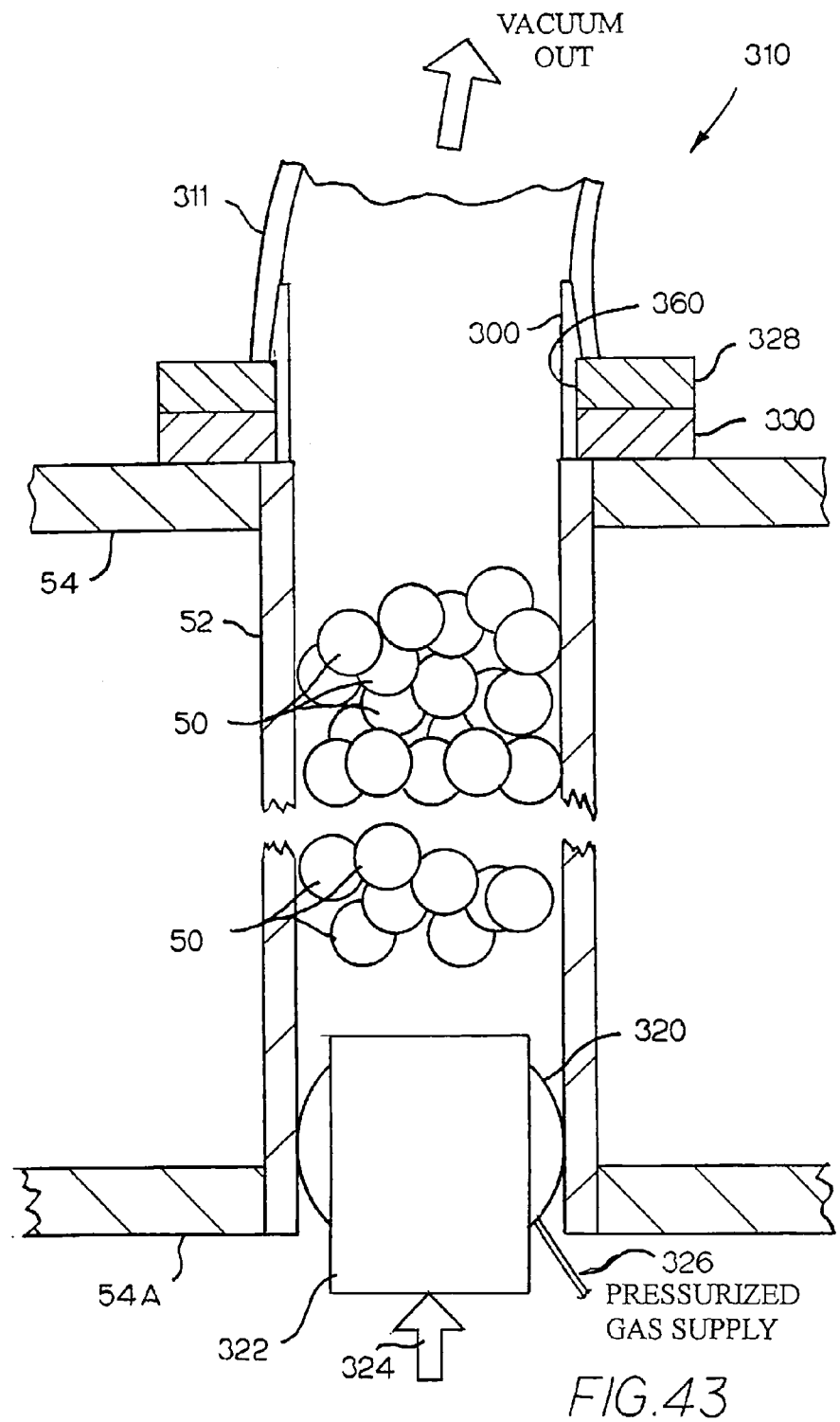
FIG. 43 is a schematic sectional view of a chemical reactor tube illustrating an arrangement for unloading particles from the chemical reactor tube by injecting pressurized gas at the bottom of the tube and vacuuming from the top.

As shown in FIG. 43, an inflatable seal 320 is inflated by means of a gas supply line 326 and is used to seal an injector tube 322 against the inner surface at the bottom of the reactor tube 52, and pressurized gas is injected through the injector tube 322 into the bottom of the reactor tube 52 to fluidize the particles in the reactor tube 52.

Figure 45:
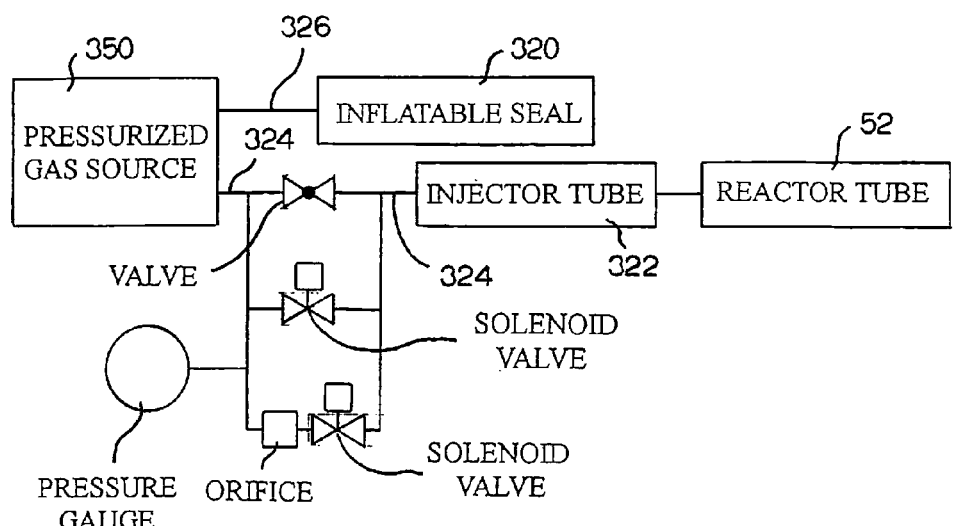
FIG. 45 is a schematic of a portion of the arrangement of FIG. 43, showing the flow path of the pressurized gas to the bottom of the chemical reactor tube.

FIG. 45 shows the gas supply that is used to provide the gas for inflating the seal 320 and for injecting into the bottom of the reactor tube 52. The pressurized gas source may be an air compressor, a tank of compressed gas, or some other source of pressurized gas. Two different gas flow paths leave that pressurized gas source 350. One gas flow path 326 provides the pressurized gas to inflate the inflatable seal 320. The other gas flow path 324 provides the pressurized gas that passes through the injector tube 322 and into the bottom of the reactor tube 52. A plurality of valves, including solenoid valves and an orifice, are shown in FIG. 45, which permits close control of the pressure and flow rate of the gas being injected through the injector tube(s) 322 into the bottom of the reactor tube(s) 52. The valve(s) can be pulsed on and off, if desired, to help break up any bridging of particles 50 in the reactor tube 52.

A device that provides an inflatable seal and an injector and that is preferred in this arrangement, is shown and described in U.S. Pat. No. 6,981,404, which is hereby incorporated herein by reference. Of course, the number of injectors may be changed to suit the particular operation.

By sealing against the inner surface of the reactor tube, this device can help hold the injector in place, making the job easier. Other seals could be used instead, if desired.

Figure 44:
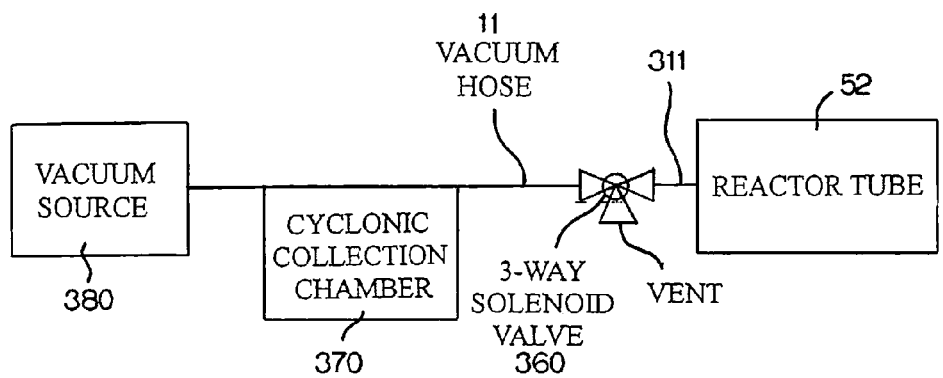
FIG. 44 is a schematic of a portion of the arrangement of FIG. 43, showing the flow path of the gas and particles leaving the chemical reactor tube.
Figure 46:
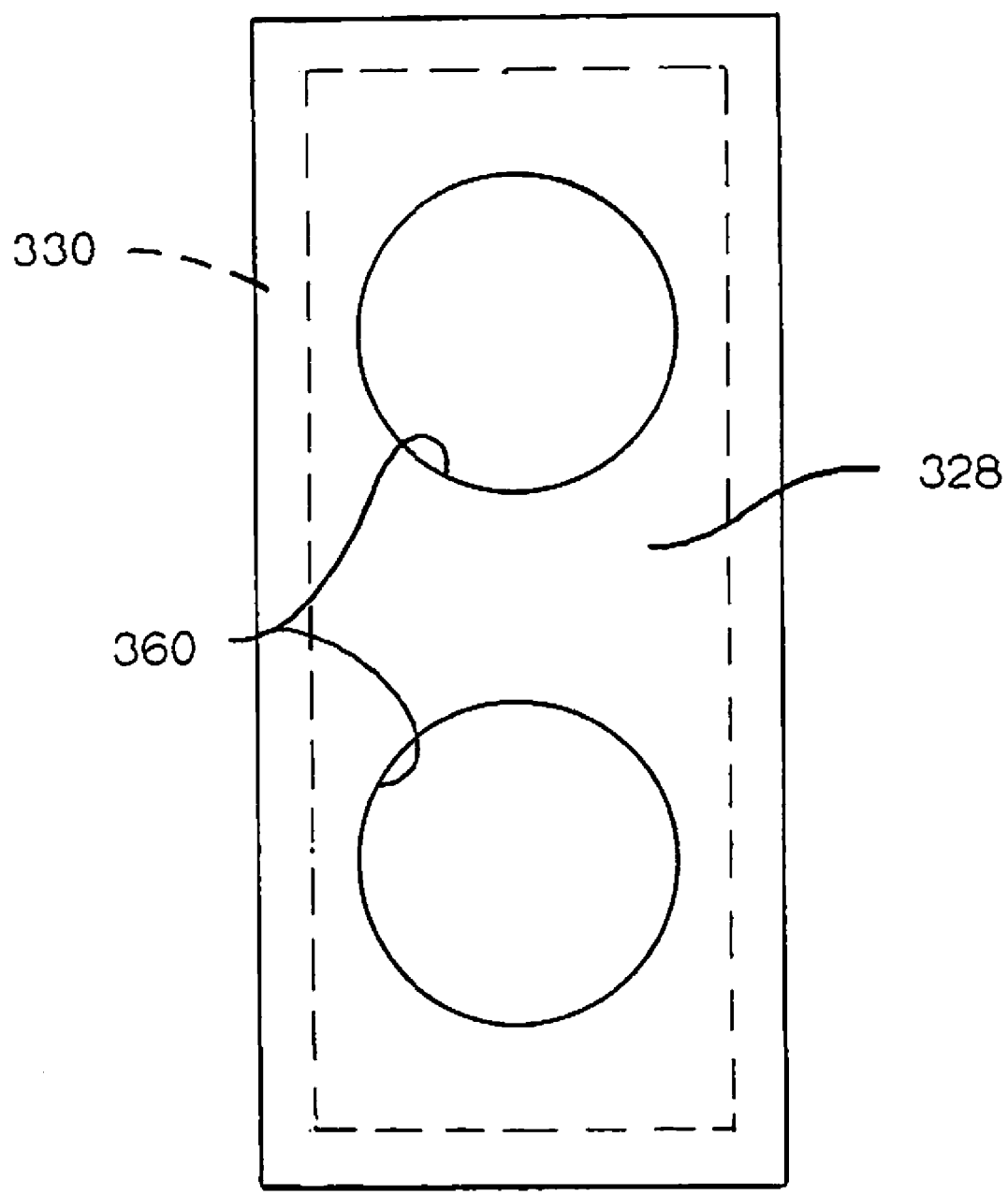
FIG. 46 is a schematic top view of the vacuum fixture used in the arrangement of FIG. 43.

Referring to FIGS. 43, 44, and 46, the vacuum fixture 310 at the top of the reactor tube(s) 52 includes a flat metal plate 328 and a flexible seal 330 that seals between the plate 328 and the top tube sheet 54 of the reactor. The plate 328 and seal 330 serve as a collar, sealing against the top tube sheet. The seal may permit some air to leak in, but it should be sufficient to keep dust from leaking out. The plate 328 in this embodiment defines two openings 360, which are slightly larger in diameter than the inside diameter of the reactor tubes 52, and which are arranged so they rest above two respective reactor tubes 52. Two connector pipes 300 fit snugly into their respective openings 360 in the plate 328 and fit snugly into a fitting 311 on the vacuum conduit 11, similar to the previous embodiment, so one vacuum conduit 11 can be used to vacuum particles out of two reactor tubes 52. The plate 328 and seal 330 resting on the top tube sheet 54 and the close fit between the plate 328 and the connector pipes 300 and the hose 311 ensure that the particles and dust that are blown out the top of the reactor tube 52 by the gas flowing through the injectors 322 will be vacuumed out through the vacuum hose conduit 11.

While this embodiment shows a seal that seals around two reactor tubes, it could seal only a single reactor tube, or the plate could cover multiple reactor tubes with an opening for each tube that it covers, and with the seal sealing at least between the perimeter of the plate and the tube sheet or sealing around each individual tube so that any catalyst and dust that leaves the tubes will be drawn through the vacuum hose. If more than one tube is being unloaded by the vacuum hose, then gas can be injected through those multiple tubes at the same time, such as by using injectors that are ganged together and inserted into multiple tubes as taught in U.S. Pat. No. 6,981,404.

It is preferred that the cross-sectional area of the path from the top of the reactor tube 52 through the connector 300 and hose 311 to the collection hopper that catches the particles be at least as large as the cross-sectional area at the top of the reactor tube 52 to minimize the opportunity for bridging of particles.

FIG. 44 shows the gas flow from the reactor tube, through the hose 311, past the three-way solenoid valve 360, through a cyclonic collection chamber 370 to a vacuum source 380. The vacuum source 380 provides a pressure below ambient at the top of the reactor tubes 52, and the pressurized gas source 350 provides gas at a pressure above ambient at the bottom of the reactor tubes 52.

The gas flow volume and pressures at the bottom and at the top may be selected to provide sufficient flow to lift the catalyst particles, fluidize them, and carry them to the collection chamber. The gas flow at the bottom may be controlled by an orifice or simply permitted to flow freely.

The gas flow at the bottom and at the top can be pulsed independently or in a coordinated manner through various means to help dislodge particles that have bridged and that are not dislodged by a steady flow of fluid. For example, the operator may rapidly open and close the gas supply solenoid valve; the rate at which the compressor (or other pressurized gas supply) operates may be changed, the vacuum force can be pulsed by selectively venting the vacuum, the rate at which a vacuum pump (or other vacuum source) operates may be changed, and so forth. It may be desired temporarily to reduce the pressure at the bottom at the same time that the vacuum level is reduced at the top, allowing the particles momentarily to fall downwardly; or it may be desired to alternate simultaneous increased pressure at the bottom and increased vacuum at the top with simultaneous decreased pressure at the bottom and decreased vacuum at the top, or to increase the pressure at the bottom while decreasing the vacuum at the top, to reduce the pressure at the bottom while increasing the vacuum at the top, or various other combinations to create pressure and fluid flow changes or even vibrations within the reactor tube to help dislodge bridged particles.

These changes may be part of an automated sequence controlled by an electronic controller so that, when bridging is encountered, the operator pushes a button and the controller puts the valves on the vacuum side and/or the valves on the high pressure side through a sequence that creates a pulsing effect by repeatedly increasing and decreasing the flow of fluid through those valves and/or repeatedly venting those valves to atmosphere in order to dislodge bridged particles.

It will be obvious to those skilled in the art that modifications may be made to the embodiments described above without departing from the scope of the present invention.

What is claimed is:

1. A method of vacuuming solid particles out of a vertical chemical reactor tube to a desired outage, comprising the steps of:
   inserting the inlet portion of a vacuum conduit having a vacuum conduit inlet and a vacuum conduit outlet into the top of the chemical reactor tube while applying a vacuum to the vacuum conduit outlet,
   vacuuming solid particles and gas out of the reactor tube through the vacuum conduit; and
   using means responsive to the depth to which the vacuum conduit is inserted into the chemical reactor tube to substantially reduce the vacuum level being applied at the vacuum conduit inlet when the vacuum conduit inlet reaches a desired depth within the reactor tube.

2. A method of vacuuming particles out of a vertical chemical reactor tube to a desired outage as recited in claim 1, and further comprising the step of providing external gas into the reactor tube through a second flow path extending through the top of the reactor tube, wherein the external gas flowing through the second flow path makes up at least one-third of the gas flowing through the vacuum conduit.

3. A method of vacuuming particles out of a vertical chemical reactor tube to a desired outage as recited in claim 1, and further providing external gas into the reactor tube through a second conduit extending through the top of the reactor tube.

4. A method of vacuuming particles out of a vertical chemical reactor tube to a desired outage as recited in claim 3, including the step of supplying the external gas to the second conduit at a pressure above ambient pressure.

5. A method of vacuuming particles out of a vertical chemical reactor tube to a desired outage as recited in claim 3, and further including the step of using the relative motion between the vacuum conduit and the chemical reactor tube to trigger the reduction in vacuum level being applied when the vacuum conduit inlet reaches the desired depth.

6. A method of vacuuming particles out of a vertical chemical reactor tube to a desired outage as recited in claim 5, wherein the vacuum conduit includes a side wall and defines a window opening through the side wall, and wherein relative motion between the vacuum conduit and a collar movably mounted on the vacuum conduit opens and closes the window opening, with the opening of the window causing a reduction in the vacuum level being applied.

7. A method of vacuuming particles out of a vertical chemical reactor tube to a desired outage as recited in claim 6, wherein the collar is biased in the closed position by means of a spring.

8. A method of vacuuming particles out of a vertical chemical reactor tube to a desired outage as recited in claim 7, wherein the vacuum conduit extends to a collection hopper and the cross-sectional area of the vacuum conduit inlet is smaller than the cross-sectional area of the remainder of the vacuum conduit up to the collection hopper in order to minimize the opportunity for bridging along the vacuum conduit.

9. A method of vacuuming particles out of a vertical chemical reactor tube to a desired outage as recited in claim 1, wherein the vacuum conduit extends to a collection hopper and the cross-sectional area of the vacuum conduit inlet is smaller than the cross-sectional area of the remainder of the vacuum conduit up to the collection hopper in order to minimize the opportunity for bridging along the vacuum conduit.

10. A method for vacuuming solid particles and gas from a vertical chemical reactor tube as recited in claim 1, and further comprising the steps of;
   mounting the vacuum conduit on a fixture, including at least two downwardly-projecting locating pins;
   setting the fixture down on the tube sheet of a chemical reactor, with said location pins projecting into two respective openings in the tube sheet; and
   activating an automatic control, which drives the inlet of the vacuum conduit into one of the chemical reactor tubes at a controlled rate to a desired depth, holds the vacuum conduit inlet at that depth for a controlled dwell time, and then retracts the vacuum conduit from the chemical reactor tube.

11. A method for vacuuming solid particles and gas from a vertical chemical reactor tube as recited in claim 10, and further comprising the step of injecting gas at a pressure higher than ambient pressure into the top of the chemical reactor tube through a second conduit as the vacuum conduit is vacuuming particles out of the chemical reactor tube.

12. A method for vacuuming solid particles and gas from a vertical chemical reactor tube, comprising the steps of:
   inserting the inlet end of a vacuum conduit and the outlet end of a second conduit into the top of the chemical reactor tube,
   applying a vacuum to the outlet end of the vacuum conduit remote from its respective inlet end, pulling solid particles from the chemical reactor tube into the vacuum conduit inlet and through the vacuum conduit to a collection hopper, and pulling gas from the chemical reactor tube through the vacuum conduit to the vacuum conduit outlet, wherein at least some of said as enters the reactor tube through the second conduit; and
   substantially reducing the vacuum level being applied at the vacuum conduit inlet when the vacuum conduit inlet reaches a desired depth within the reactor tube.

* * * * *